(12) United States Patent
Moabery et al.

(10) Patent No.: US 12,437,271 B2
(45) Date of Patent: Oct. 7, 2025

(54) METHODS AND SYSTEMS FOR MONITORING AND CERTIFYING AIRCRAFTS AND COMPONENTS OF AIRCRAFTS

(71) Applicant: GA TELESIS, LLC, Fort Lauderdale, FL (US)

(72) Inventors: Abdol Moabery, Delray Beach, FL (US); Darryl Maraj, Parkland, FL (US); Alvin Khoo, Greenwich, CT (US)

( * ) Notice: Subject to any disclaimer, the term of this patent is extended or adjusted under 35 U.S.C. 154(b) by 144 days.

(21) Appl. No.: 18/512,335

(22) Filed: Nov. 17, 2023

(65) Prior Publication Data
US 2024/0086866 A1 Mar. 14, 2024

Related U.S. Application Data

(63) Continuation-in-part of application No. 17/084,089, filed on Oct. 29, 2020, now Pat. No. 11,820,529.

(60) Provisional application No. 62/927,555, filed on Oct. 29, 2019.

(51) Int. Cl.
| | | |
|---|---|---|
| G06Q 10/20 | (2023.01) | |
| B64F 5/60 | (2017.01) | |
| H04L 9/00 | (2022.01) | |
| H04L 9/32 | (2006.01) | |

(52) U.S. Cl.
CPC ............ *G06Q 10/20* (2013.01); *B64F 5/60* (2017.01); *H04L 9/3247* (2013.01); *H04L 9/50* (2022.05)

(58) Field of Classification Search
CPC .. G06Q 10/20; B64F 5/60; H04L 9/50; H04L 9/3247
USPC .......................................................... 701/3
See application file for complete search history.

(56) References Cited

U.S. PATENT DOCUMENTS

| | | | |
|---|---|---|---|
| 10,521,780 B1* | 12/2019 | Hopkins, III | G06Q 20/3825 |
| 10,826,685 B1* | 11/2020 | Campagna | H04L 9/3247 |
| 11,574,308 B2* | 2/2023 | Robotham | G06Q 10/083 |
| 11,820,529 B2* | 11/2023 | Maraj | G06F 16/29 |
| 2017/0005804 A1* | 1/2017 | Zinder | H04L 9/3239 |
| 2018/0341915 A1* | 11/2018 | Narasimhan | G06F 16/93 |
| 2019/0303541 A1* | 10/2019 | Reddy | G06F 21/64 |
| 2019/0319798 A1* | 10/2019 | Chalkias | H04L 9/3236 |
| 2019/0340269 A1* | 11/2019 | Biernat | H04L 9/3239 |
| 2019/0384587 A1* | 12/2019 | Rao | G06F 21/572 |
| 2020/0028691 A1* | 1/2020 | Rao | G06F 8/658 |
| 2020/0065380 A1* | 2/2020 | Kartoun | G06Q 10/103 |

(Continued)

*Primary Examiner* — Luis A Martinez Borrero
(74) *Attorney, Agent, or Firm* — Derek Fahey, Esq.; The Plus IP Firm, PLLC

(57) ABSTRACT

A method executed by at least one server for monitoring and certifying a plurality of assets is disclosed. The server receives from at least one first computing device, a first data packet comprising a plurality of asset data associated with a particular asset, and a first computing device signature associated with a first computing device. Further, after authenticating the first computing device signature, the server creates an asset record, wherein a plurality of asset data associated with the particular asset is recorded. Additionally, the server is configured for generating a response message to a request message based on the asset data in the asset record, the response message includes i) at least one metric associated with the plurality of asset attributes of the asset and ii) and a tag identifying that the at least one metric provided in the response message has been authenticated.

17 Claims, 23 Drawing Sheets

(56) References Cited

U.S. PATENT DOCUMENTS

| | | | |
|---|---|---|---|
| 2020/0074410 A1* | 3/2020 | Binder | G06F 16/182 |
| 2020/0184548 A1* | 6/2020 | Rao | G06Q 30/0645 |
| 2020/0184739 A1* | 6/2020 | Nathan | G06Q 10/20 |
| 2020/0204400 A1* | 6/2020 | Skertic | G06F 16/242 |
| 2020/0235943 A1* | 7/2020 | Salimi | H04L 9/006 |
| 2020/0294128 A1* | 9/2020 | Cella | H04L 9/3239 |
| 2020/0351094 A1* | 11/2020 | Canterbury | H04L 9/0637 |
| 2021/0004739 A1* | 1/2021 | Gill | G06Q 10/067 |
| 2021/0044426 A1* | 2/2021 | Campagna | H04L 63/123 |
| 2021/0065085 A1* | 3/2021 | Walls | G06Q 10/063118 |
| 2021/0122489 A1* | 4/2021 | Maraj | H04L 63/123 |
| 2021/0135877 A1* | 5/2021 | Janaudy | H04L 63/126 |
| 2021/0226771 A1* | 7/2021 | Gale | H04L 9/0643 |
| 2021/0264444 A1* | 8/2021 | Chen | G06T 11/00 |
| 2021/0326872 A1* | 10/2021 | Robotham | G06Q 10/083 |
| 2021/0399889 A1* | 12/2021 | Muthukrishnan | G06Q 20/401 |
| 2022/0343292 A1* | 10/2022 | Hochman | B64F 5/60 |
| 2023/0153812 A1* | 5/2023 | Robotham | H04L 9/50 705/67 |

* cited by examiner

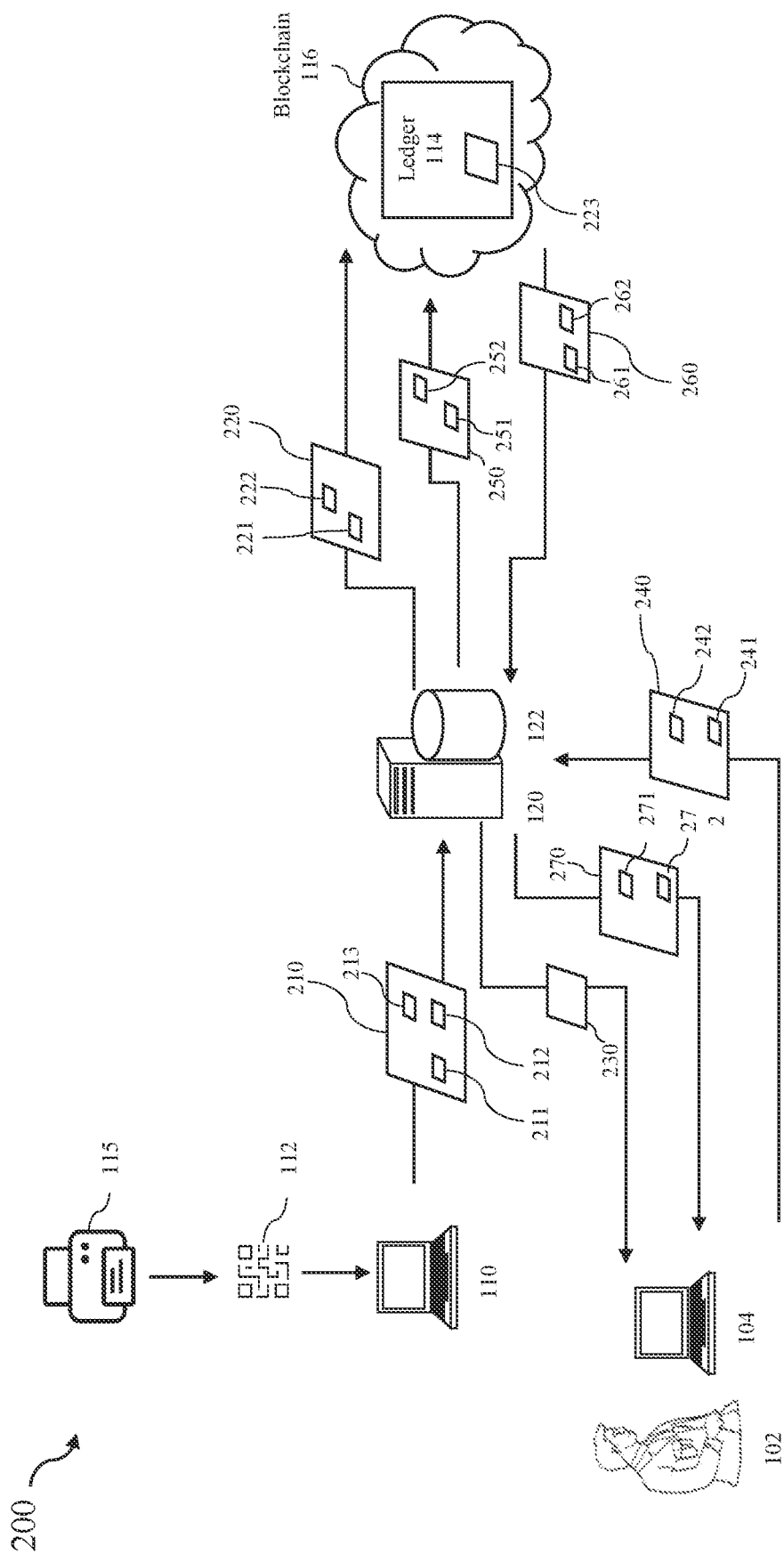

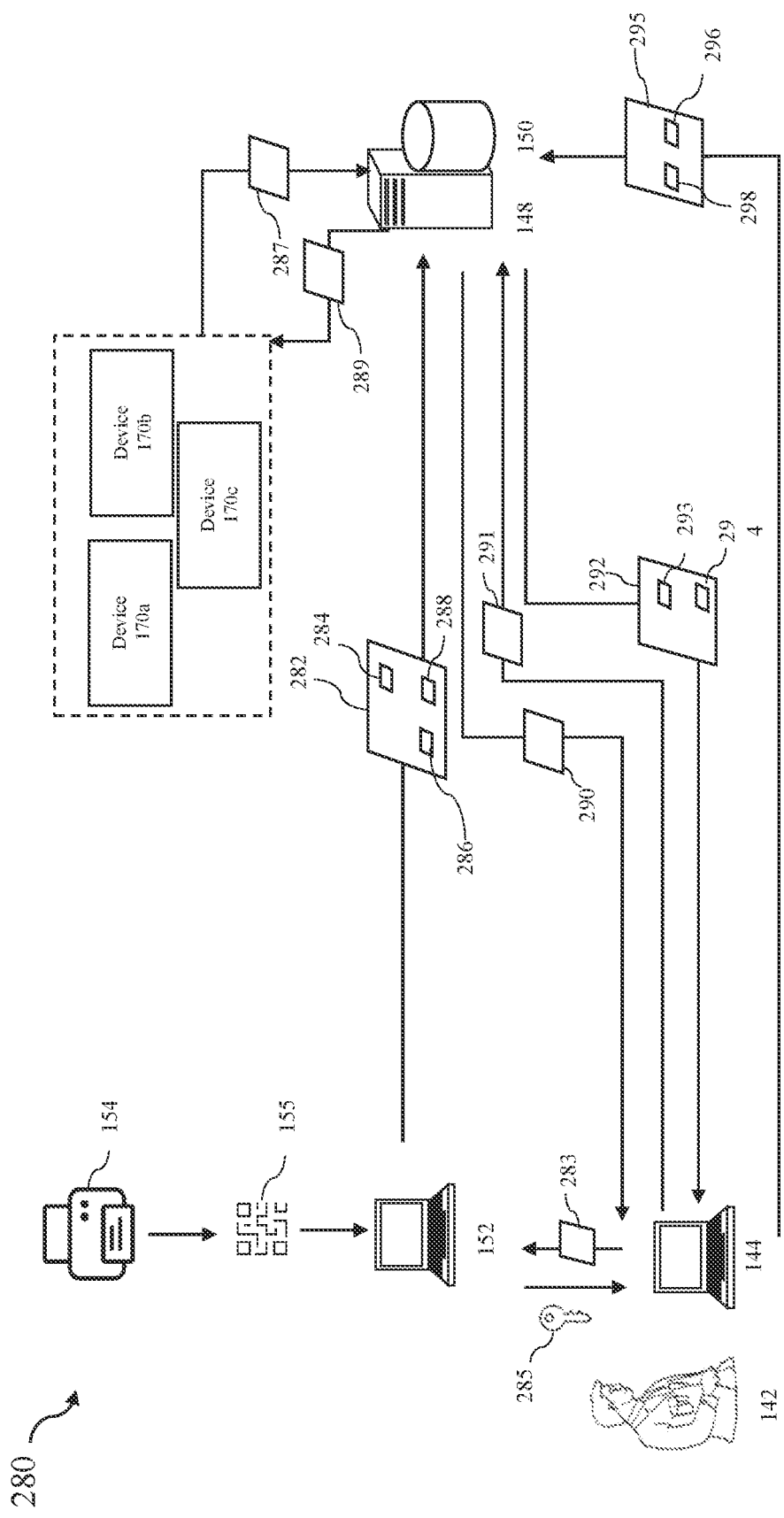

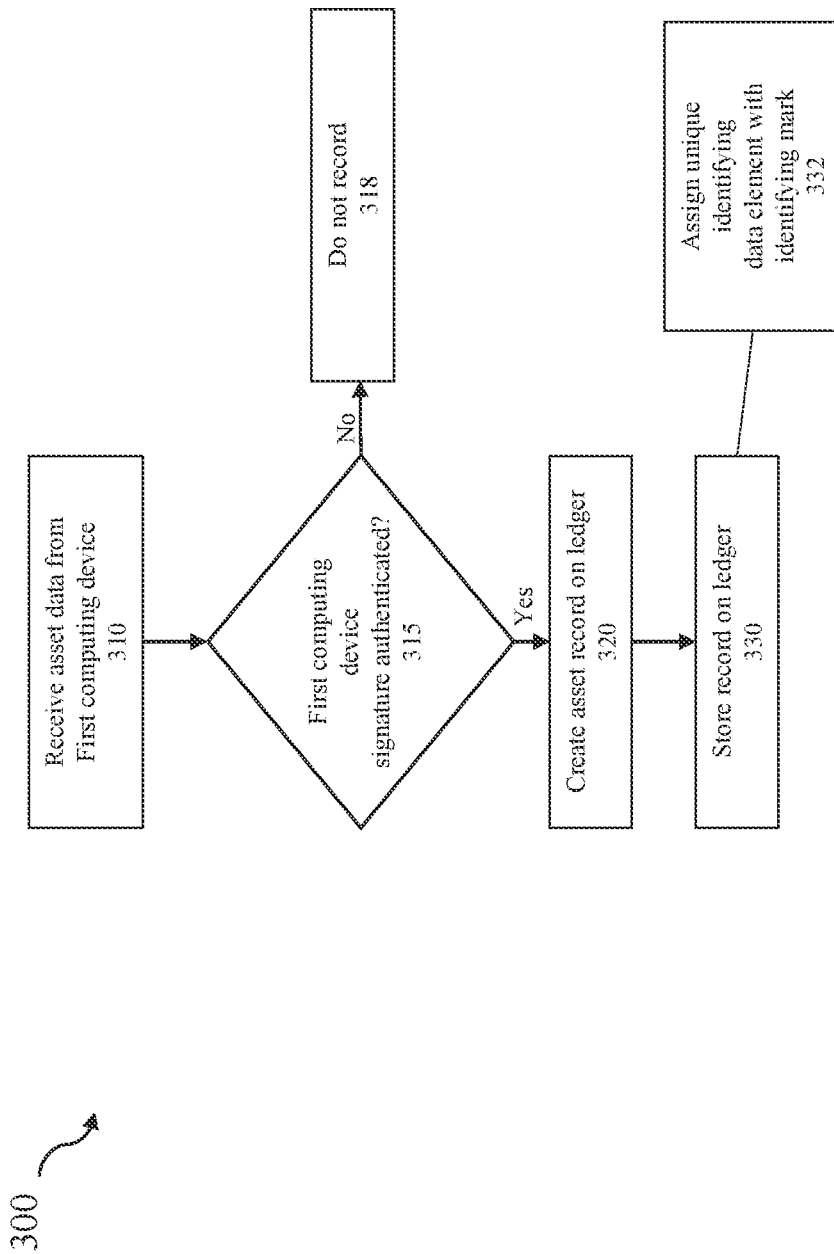

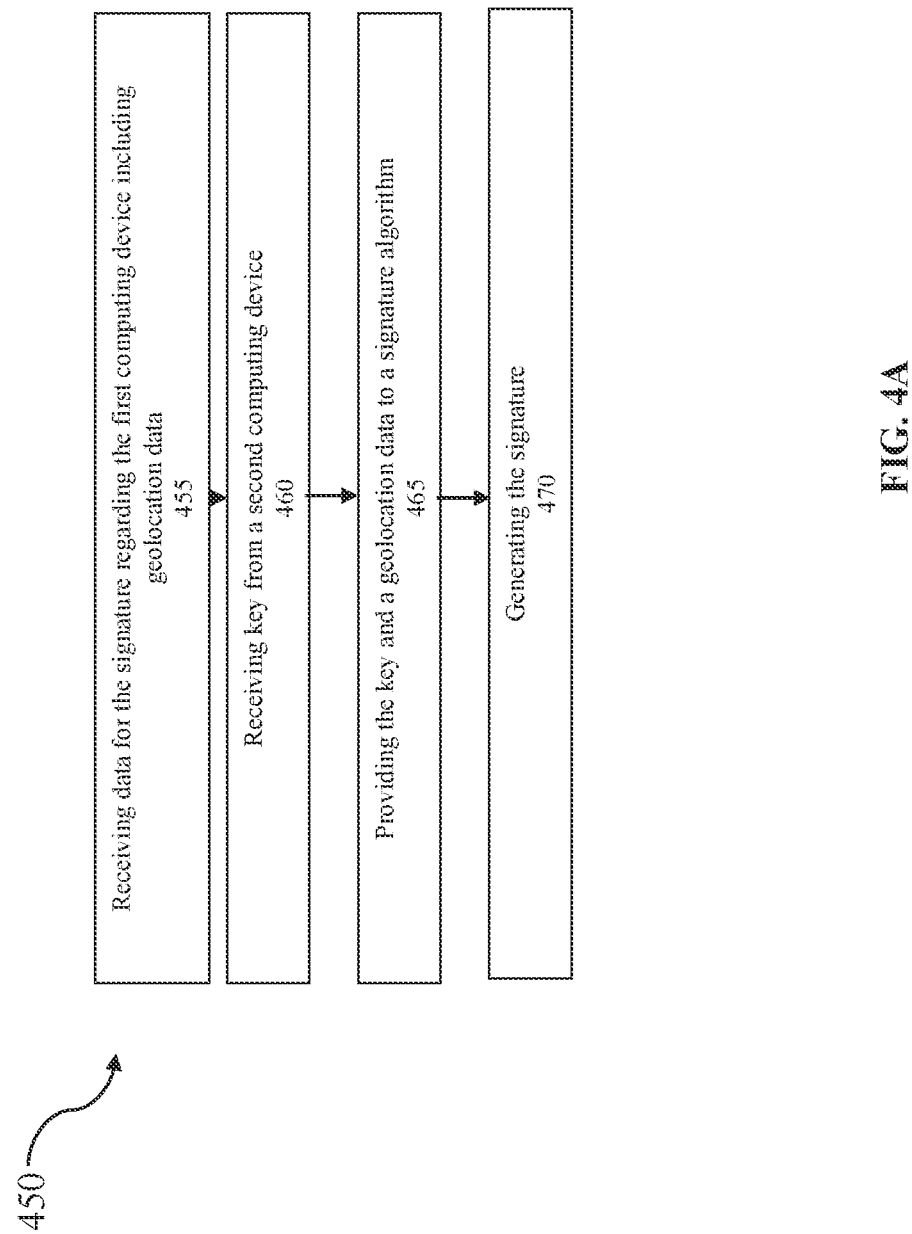

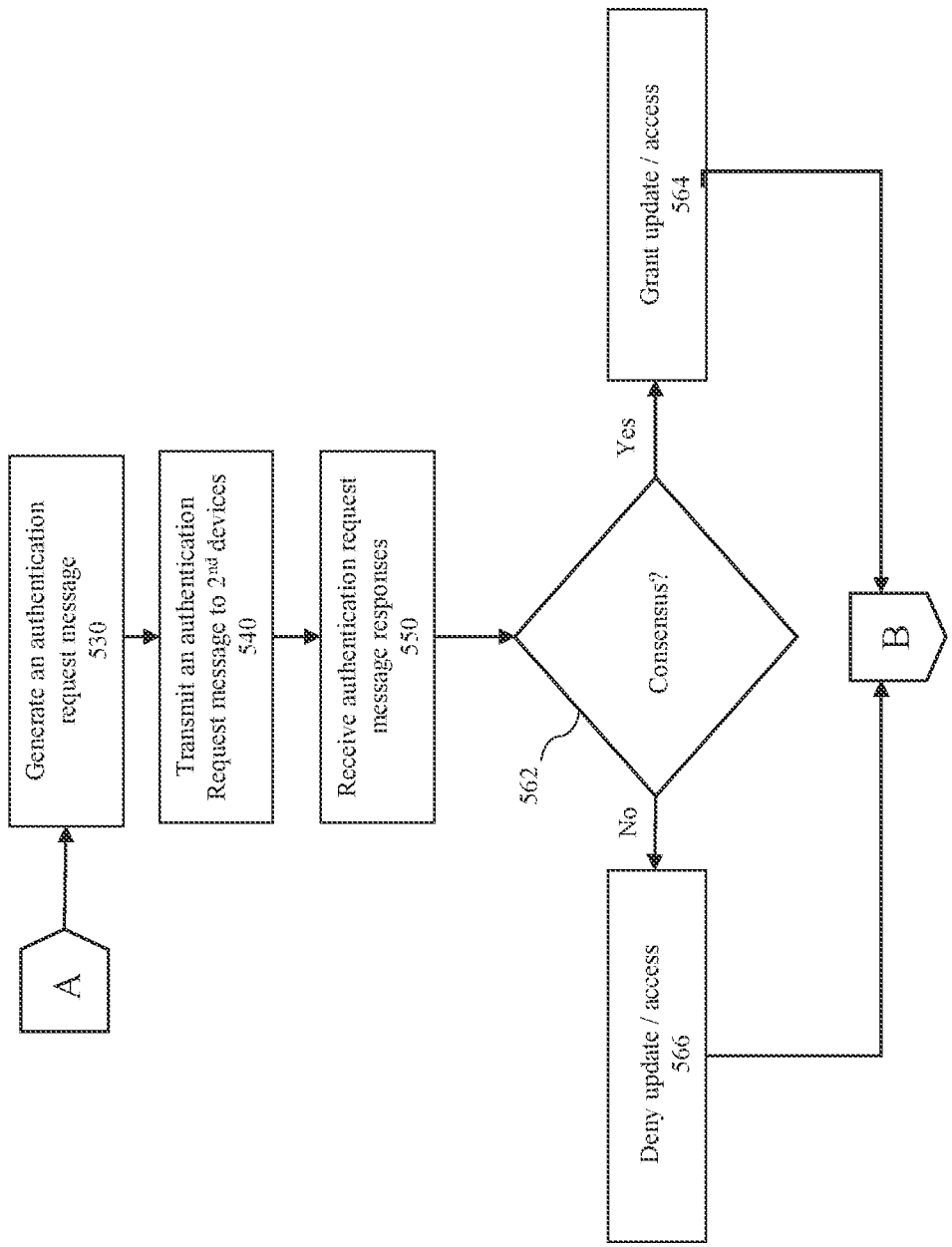

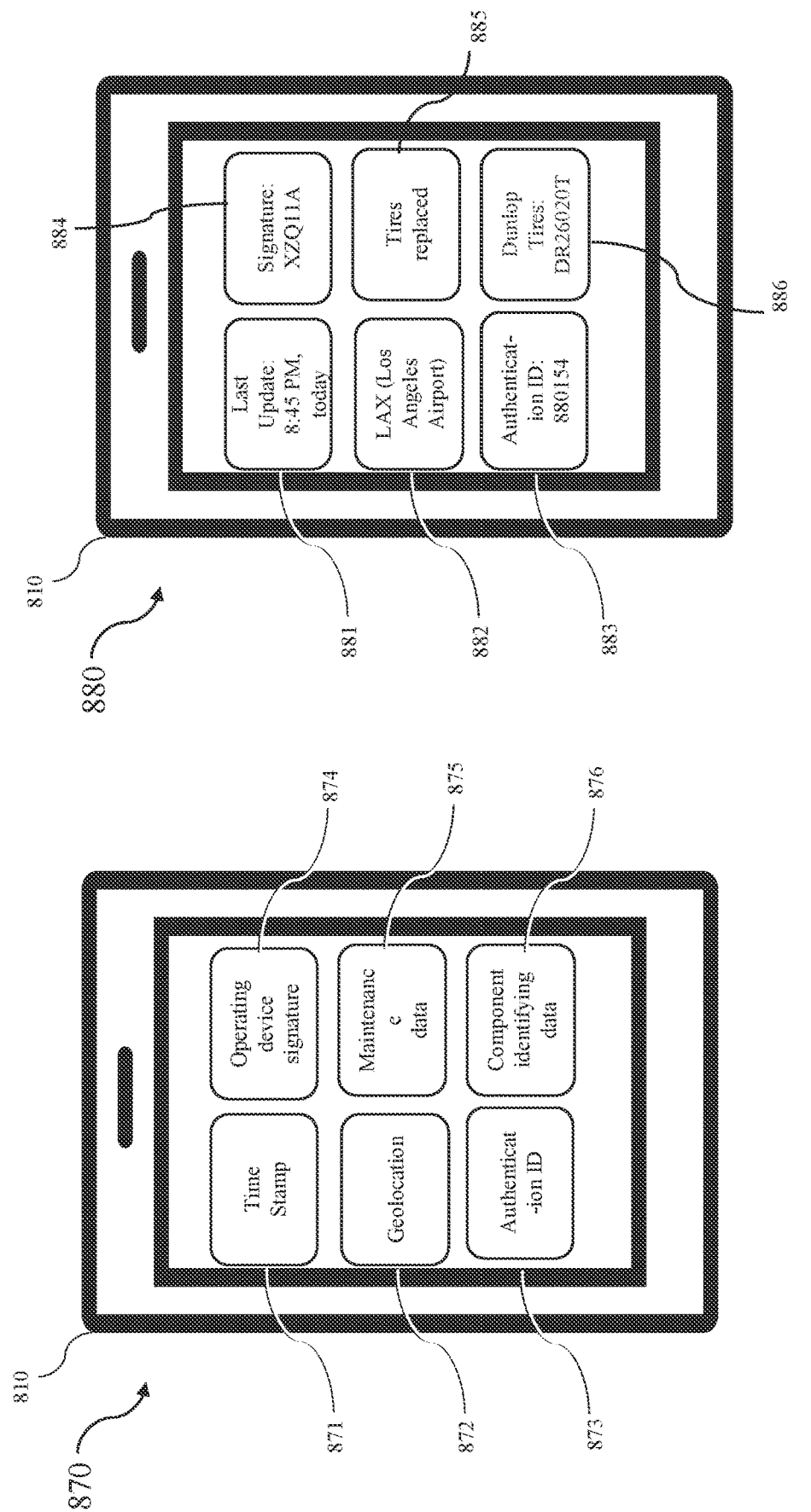

Provenance Data

| Type | Date | Ownership ID | Authentication ID | Part ID | Device ID | Device Loc. |
|---|---|---|---|---|---|---|
| Add | 9/20/20 | American Airlines® | 184932034 | DP-1032 | LAX2993 | Los Angeles, CA |
| Access | 10/2/20 | American Airlines® | 154233644 | DP-1032 | JFK1443 | Queens, NY |
| Update | 10/20/20 | JetBlue® | 545668523 | DP-1032 | DEN1032 | Miami, FL |

FIG. 9b

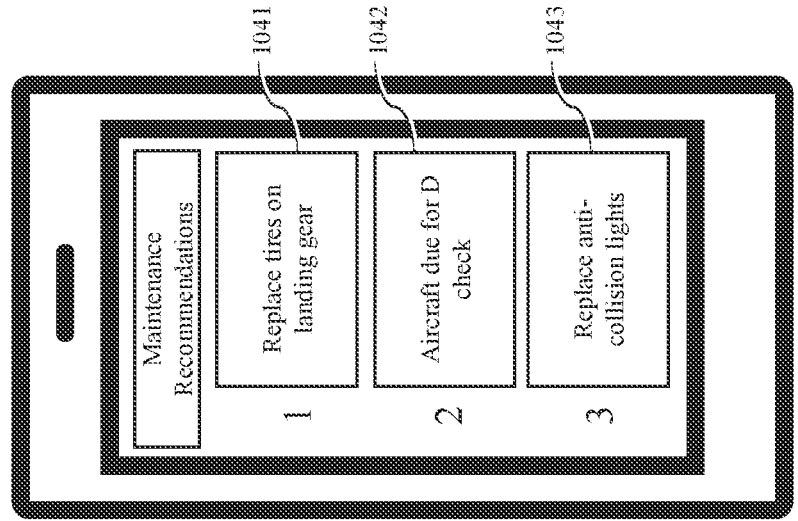
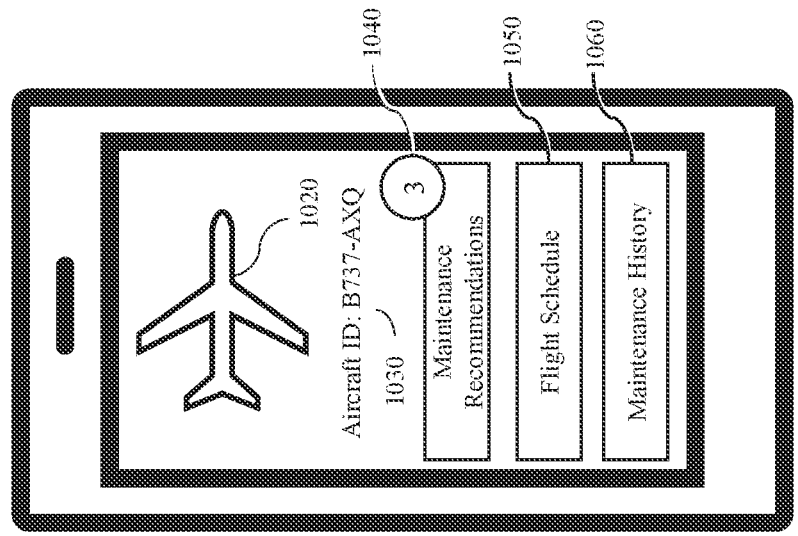
FIG. 10b
FIG. 10a

METHODS AND SYSTEMS FOR MONITORING AND CERTIFYING AIRCRAFTS AND COMPONENTS OF AIRCRAFTS

CROSS-REFERENCE TO RELATED APPLICATIONS

This application is a continuation in part that claims the benefit of the filing date of U.S. Non-provisional application Ser. No. 17/084,089 entitled "METHODS AND SYSTEMS FOR MONITORING AND CERTIFYING AIRCRAFTS AND COMPONENTS OF AIRCRAFTS" and filed Oct. 29, 2020, which claims the benefit of the filing date of U.S. Provisional Application Ser. No. 62/927,555 entitled "METHODS AND SYSTEMS FOR MONITORING AND CERTIFYING AIRCRAFTS AND COMPONENTS OF AIRCRAFTS" and filed Oct. 29, 2019, the subject matter of which is incorporated herein by reference.

TECHNICAL FIELD

The present invention relates to the field of distributed ledger technology, and more specifically to the field of monitoring and certifying aircrafts and aircraft components.

BACKGROUND

In modern aeronautical systems, assets such as aircrafts and components of aircrafts are disseminated and stored across a wide geographic span. Due to the unprecedented and abundant amount of aircraft travel, whether private or commercial, aircrafts and components of aircrafts are constantly being removed, fixed, or replaced in order to seamlessly meet the demands of the current aeronautical industry. A common issue associated with meeting these demands is accounting for factors such as the location, the status of repair, and the applicable certifications, such as airworthiness and conformance, related to the aircraft components. Another common issue is the lack of ability for applicable entities to provide a security mechanism associated with monitoring and certifying aircrafts and their components allowing otherwise sensitive information related to the process to be viewed by unwanted parties. Due to some of the disadvantages of the current approaches, the process of monitoring and certifying aircrafts and their components is not only time-consuming, but also requires a significant number of arduous tasks that must be performed manually.

Because of these issues, many times airlines will spend significant funds to recertify components that may already been certified because paperwork and data on the components may have been lost. This can be an extreme waste and time, resources, and money. Additionally, one of the issues with certification of aircraft components is a significant amount of time and money goes into determining the trustworthiness of airline components. Many of these problems can be fixed if aircraft component monitoring and certification was recorded on a single shared ledger. Currently, single shared ledgers do exist, but a combination of technological and practical constraints have made such ledgers difficult to apply to the aeronautical industry. In particular, the lack of ability to account for the massive quantities of information related to the process along with the inability to utilize real-time data in order to predict aircraft components in need of replacement or repair, and the lack of security associated with the aforementioned data renders the approach difficult to apply to the industry. As a result, there exists a need for improvements over the prior art, and more specifically, a system and method configured to provide automated and secure significant tasks associated with the repairing, certification, and authorization of aircrafts and components of aircrafts.

SUMMARY

A method executed by at least one server for monitoring and certifying a plurality of assets is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method executed by at least one server for monitoring and certifying a plurality of assets is disclosed. In one embodiment, the method comprises (a) receiving, from a first computing device, i) a first data packet comprising a plurality of asset data associated with an asset and ii) a first computing device signature associated with the first computing device, wherein the plurality of asset data comprises a unique asset identifier associated with the asset and a plurality of asset attributes associated with the asset, wherein each asset attribute has a metric, and wherein the first computing device signature provides non-repudiation and data integrity of the first data packet, and the first computing device signature is generated from at least a key provided by a second computing device, (b) creating, in a connected database, an asset record, (c) recording, in the asset record, the plurality of asset data associated with the asset after authenticating the first computing device signature from a plurality of first computing device signatures stored in the connected database, (d) subsequent to creating and recording the asset record, receiving, over a communications network, a request message for at least a portion of the plurality of asset data associated with at least one of the plurality of asset attributes for one of the plurality of assets, (e) accessing, in the connected database, the asset record associated with the request message and reading the plurality of asset data in the asset record, (f) generating a response message to the request message based on the plurality of asset data in the asset record, wherein the response message includes i) at least one metric associated with at least one of the plurality of asset attributes of the asset and ii) a tag identifying that the at least one metric provided in the response message has been authenticated.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 2 is a schematic illustrating the flow of data in relation to example embodiments for creating and storing an asset record, and accessing the asset record by an operator;

FIG. 2A is a schematic illustrating the flow of data in relation to example embodiments for creating and storing an asset record, and accessing the asset record by an operator, according to another example embodiment;

FIG. 3 is a block flow diagram of an example embodiment for creating and storing an asset record on a ledger;

FIG. 4A is a block flow diagram of an example embodiment for generating a signature;

FIG. 5c is a block flow diagram of an example embodiment for authenticating an operator's request to access or update an access record by a plurality of decentralized second party devices;

FIG. 8b is an example embodiment of a graphical user interface of an operator interface;

FIG. 8c is an example embodiment of the graphical user interface depicted in FIG. 8b, which includes example data in report;

FIG. 9b is an example embodiment of a graphical user interface of a provenance data report;

FIG. 10a is an example embodiment of an asset record interface for an aircraft, including a maintenance recommendations portion;

FIG. 10b is an example embodiment of a maintenance recommendation interface originating from the asset record interface of FIG. 10a.

DETAILED DESCRIPTION

Figure 1:
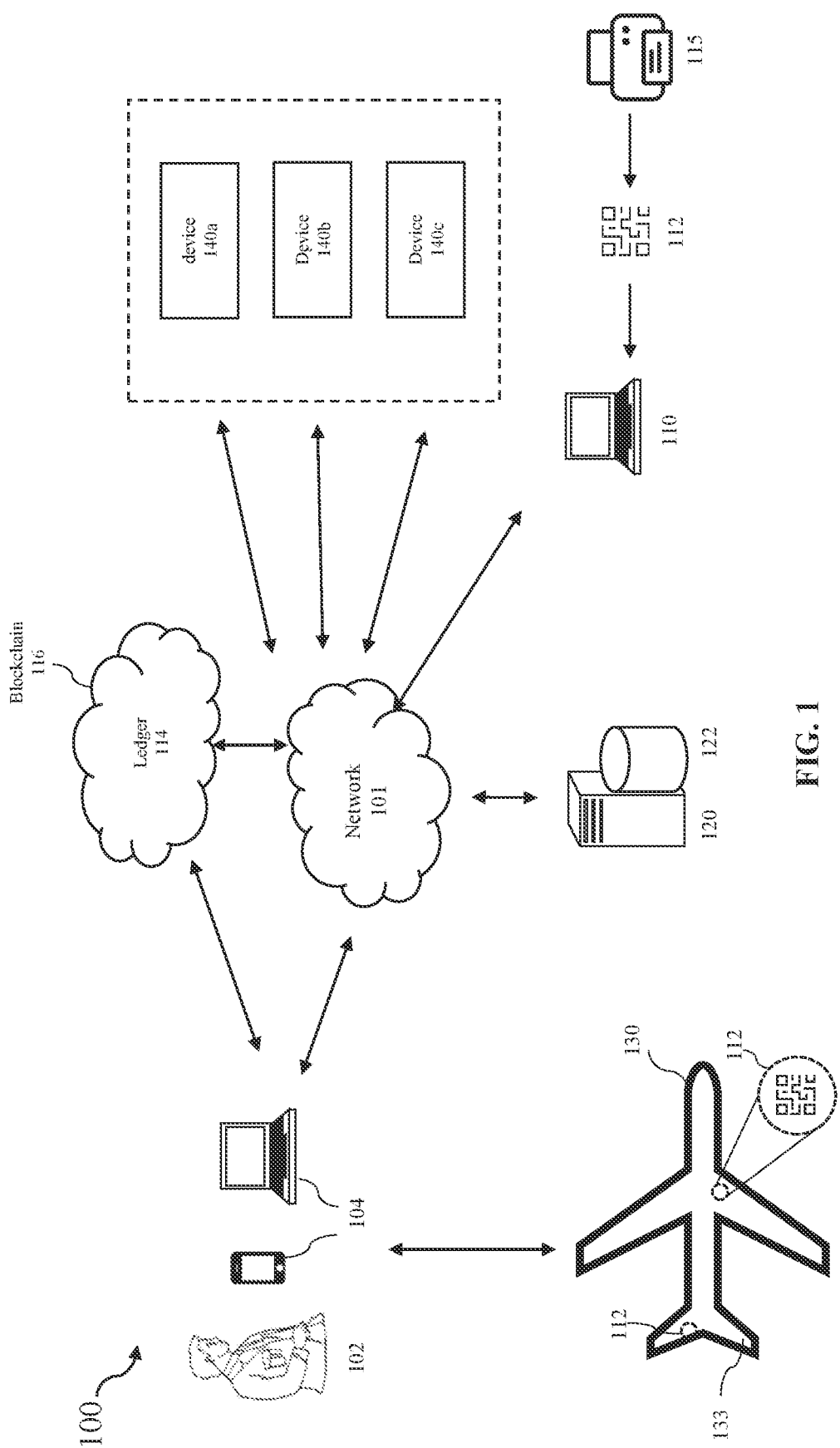
FIG. 1 is a block diagram illustrating a system for monitoring and certifying aircraft and aircraft parts, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system that monitors and certifies aircrafts and components of aircrafts utilizing unique identifying marks affixed (e.g., physically attached, physically adhered to) to the aircrafts and/or components of the aircrafts. Based on a scanning of a unique identifying mark (e.g., a printed unique identifying mark), asset record data related to the aircraft and/or its' components may be requested and received from a server. Asset records associated with the component(s) are created and stored in a ledger (e.g., an electronic ledger on a blockchain), allowing monitoring and certification of the aircraft and aircraft components to be performed in an encrypted and secure manner. The system may further employ machine learning algorithms in order to perform analyses and predictions related to the asset record data associated with the aircraft and its' components. The system also provides a unique interface for users to easily choose an aircraft component that the user would like to investigate. In one embodiment the unique interface includes a wheel- and/or ring-type interface for toggling between the various data sources, such as maintenance records, warranty status records, IPC/CMM documentation etc. The system also allows the user to generate reports that include information regarding the provenance of the devices that input the data related to particular item. The system improves over the prior art by providing enhanced security and authentication of devices before allowing the devices to add a record or update a record in the database. In an embodiment, the system requires the devices to provide additional data, such as geolocation, IP address and biometric data associated with the devices or device owners for verifying and authenticating the devices before adding or updating the record in the database. Additionally, in one embodiment the system improves over the prior art by providing a display interface that allows a user to see that the Ledger entries were done by authenticated devices thus improving the efficiency of allowing a user to determine that a particular asset as the appropriate verification needed.

i. Operating System/Environment

Referring now to the Figures, and with particular reference to FIG. 1, a system 100 is shown. System 100 includes a combination of hardware and software. In some embodiments, the various methods described herein are implemented at least partially by hardware of one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending on the arrangement.

As illustrated, system 100 includes a network 101 in communication with an operator 102 via the operator's device 104, a first device 110, a blockchain 116 having a ledger 114, a server 120 and database 122, and a plurality of second party devices (140a-140c). Network 101 may include one or more packet switched networks, such as the Internet, or any local area networks, wide area networks, enterprise private networks, cellular networks, phone networks, mobile communications networks, or any combination thereof. Network 101 communicatively couples each component of system 100 and may utilize known security precautions such as encryption, passwords, limited Wi-Fi range, and the like.

As noted above, the plurality of second party devices (140a-140c) may be decentralized. The term, "plurality of decentralized second party devices" means a plurality of second party devices that are not in a single location or located on a single machine. In its simplest form, a decentralized network eliminates the need for one central server or entity and allows for multiple nodes (servers) to act together to complete a specific task. Decentralized networks are organized in a much more distributed fashion. Each node within the network functions as a separate authority with independent decision-making power regarding how it interacts with other systems. These networks also distribute processing power and workload functions among connected servers.

As noted above, the operator 102 may operate an operator device 104. System 100 also includes a first device 110 and a plurality of second devices (140a-140c). The operator device(s), first device 110, and/or second devices (140a-140c) may be any suitable computing device. Non-limiting examples of computing devices that may be used include a laptop computer, a tablet computer, a smartphone, a desktop computer, and any other computing device used to access networks and software. Generally speaking, the operator device 104 and first device 110 is one or more of a remote computing device, such as a tablet computer, a smartphone, and a laptop computer. The plurality of second devices (140a-140c) may similarly be one of these remote computing devices, further including non-remote computing devices such as desktop computers and servers. The blockchain 116 may be comprised of a plurality of any of the foregoing computing devices. Moreover, the second party devices (140a-140c) may make-up the blockchain 116 or may be a subset of the devices on the blockchain 116.

An example of software that executes on the computing devices (104, 110, 140a-140c) includes a platform configured to organize, monitor, and analyze data associated with identifying mark 112. The identifying mark 112 may be processed by a machine learning component (not illustrated). For instance, a machine learning component may utilize received data obtained from the system to generate a model function for a set of input and output training data. Training data includes multiple training instances which may correspond to data retrieved from the identifying mark 112 including, but not limited to Aircraft Maintenance Manual (AMM), IPC, Trouble Shooting Data, Maintenance History, All Maintenance Release Paperwork, Traceability Data, Reliability Data, Warranty Administration, TSN/SO-CSN/CSO, and any other applicable data pertaining to aircraft 130 and/or aircraft components 133.

System 100 includes a printing device 115 configured to generate a unique identifying mark 112. The unique identifying mark 112 may be printed in any suitable fashion. For instance, the unique identifying mark 112 may be printed by printing device 115 onto a parchment of sorts having an adhesive side and a printing side. The adhesive side may be exposed by removing a barrier to expose the adhesive, followed by affixing (e.g., adhering, attaching) the unique identifying mark 112 to the aircraft 130 and/or aircraft components 133. Non-limiting examples of unique identifying marks include, but are not limited to, a quick response code ("QR code"), a bar code (e.g., codablock), an access code (e.g., a string of random numbers/letters of a specified length), an identification ("id") tag, a hexadecimal code, a binary code, a bokode, a color code, a high capacity color barcode (HCCB), a radio frequency identification ("RFID") chip, a near-field communication ("NFC") chip, and/or any other suitable machine-readable representation of data. In one embodiment, the unique identifying mark is preferably a QR code or barcode. Advantageously, a QR code and/or barcode may graphically represent a unique data element, such as a string of characters and/or numbers.

As noted above, the unique identifying mark 112 may be a printed mark, however, non-printed marks such as laser-etched marks may be used and are within the spirit and scope of the invention. As described in greater detail below, the unique identifying mark 112 may be used as a unique asset identifier. In this way, the unique identifying mark may allow a user to quickly access records associated with a particular asset. As a non-limiting example, a user may readily access a plurality of asset data (e.g., installation date, replace by date) associated with a particular asset (i.e., an aircraft component) by simply scanning (e.g., via a smartphone) a QR code found on the surface of the particular asset.

As noted above, system 100 includes aircraft 130. The operator may be in proximity with an aircraft 130. Aircraft 130 includes a plurality of aircraft components 133. An aircraft component may be any component found on an aircraft. In one embodiment, an aircraft component is an engine component. In one embodiment, an aircraft component is a wing component. In one embodiment, an aircraft component is a cabin component. In one embodiment, an aircraft component is a galley component. While the present disclosure may generally discuss aircrafts and aircraft components as assets, it is understood, that other types of assets may be used and are within the spirit and scope of the present invention.

At least two of the aircraft components 133 include a unique identifying mark 112. Each of the plurality of aircraft components 133 may be identified by their respective unique identifying marks 112, and each unique identifying mark 112 may be associated with a unique data element, such as a record identification number. Identifying marks may be utilized (e.g., scanned) to programmatically obtain asset records associated with the asset. The asset records may include one or more metrics associated with one or more attributes of the asset. An example of an asset record is a documentation record associated with the particular asset. For instance, the tires of the landing gear of an aircraft may come with documentation of attributes associated with the particular tires and the documentation may outline the recommended number of landings before replacing the tires. Other types of metrics associated with the asset may also be used and are within the spirit and scope of the present invention.

Another example of an asset record is a maintenance record. A maintenance record may include, for instance, metrics concerning an attribute of the landing gear tires. It is understood that metrics may measurements, dates, times, quantities, statistics, probabilities, alphanumeric characters, colors, shades, etc. For instance, data relating to the last time the tires of the landing gear were inspected may be included. Other types of asset records include a geolocation associated with a particular asset, an Illustrated Parts Catalog (IPC) associated with the particular asset and Component Maintenance Manual (CMM) associated with the particular as set.

In another aspect, asset record data may also include ownership data. An aircraft 130 may include aircraft components 133. and the entity that owns the aircraft 130 may differ from the entity that owns one or more of the aircraft components 133. As a non-limiting example, turbine blades in the engines may be owned by an entity other than the aircraft itself. For instance, the turbine blades may be leased by an entity to an airline. Thus, in some embodiments, an asset record includes ownership data. Ownership data may also include chain of title data, i.e., data indicating dates of the transfer of ownership and the entities involved in the transfer of ownership.

In one aspect, asset record may include detailed specification, such as dimensions (length, width, weight) and materials (titanium alloy or Aluminum) of the aircraft component. The material information may include details about the specific alloys, composites, or other materials employed in the construction of the component. Additionally, the asset record may include regulatory compliance data, such as, but not limited to, information regarding the component's compliance with aviation regulations, certifications, and airworthiness standards, such as Federal Aviation Administration (FAA) certification, European Union Aviation Safety Agency (EASA) certification, FAA's Technical Standard Order (TSO) standards, etc. The asset record may also include applicability and compatibility information of the aircraft components with different makes, sizes, and models of the aircrafts.

Various communications may be sent to and from the entities shown in system 100 using server 120. For instance, and with reference to the figures now including FIG. 2, server 120 may receive a first data packet comprising a plurality of asset data associated with a particular asset record 223 to be added to ledger 114. In response to the first data packet 210, server 120 may generate and send a message 220 to the ledger 114 on the blockchain 116 to create and store the asset record(s) on the ledger 114. In response to message 220, blockchain 116 may send a response message, including an approval or denial of the first device's 110 request to add an asset record to the ledger 114.

In another example, operator 102 may be sent an operator interface message 230, where the operator interface message 230 comprises an operator interface or graphical user interface. The operator interface message may be configured to display an interface configured to receive input, at the direction of the operator, which may include alpha numeric characters, audio content, and visual content, among others. The operator 102 may send an operator request message 240 to request at least a portion of an asset record 223. The portion of the asset record may include metrics associated with attributes associated with a particular asset or a portion of the asset. Server 120 may process the operator request message 240 and send an access message 250 to blockchain 116. Blockchain 116 may respond with an approval or denial in a blockchain response message 260 and a copy of the asset record 261 requested. Server 120 may process the copy of the asset record 261 and send a response message corresponding to the operator request message 240.

Figure 5A:
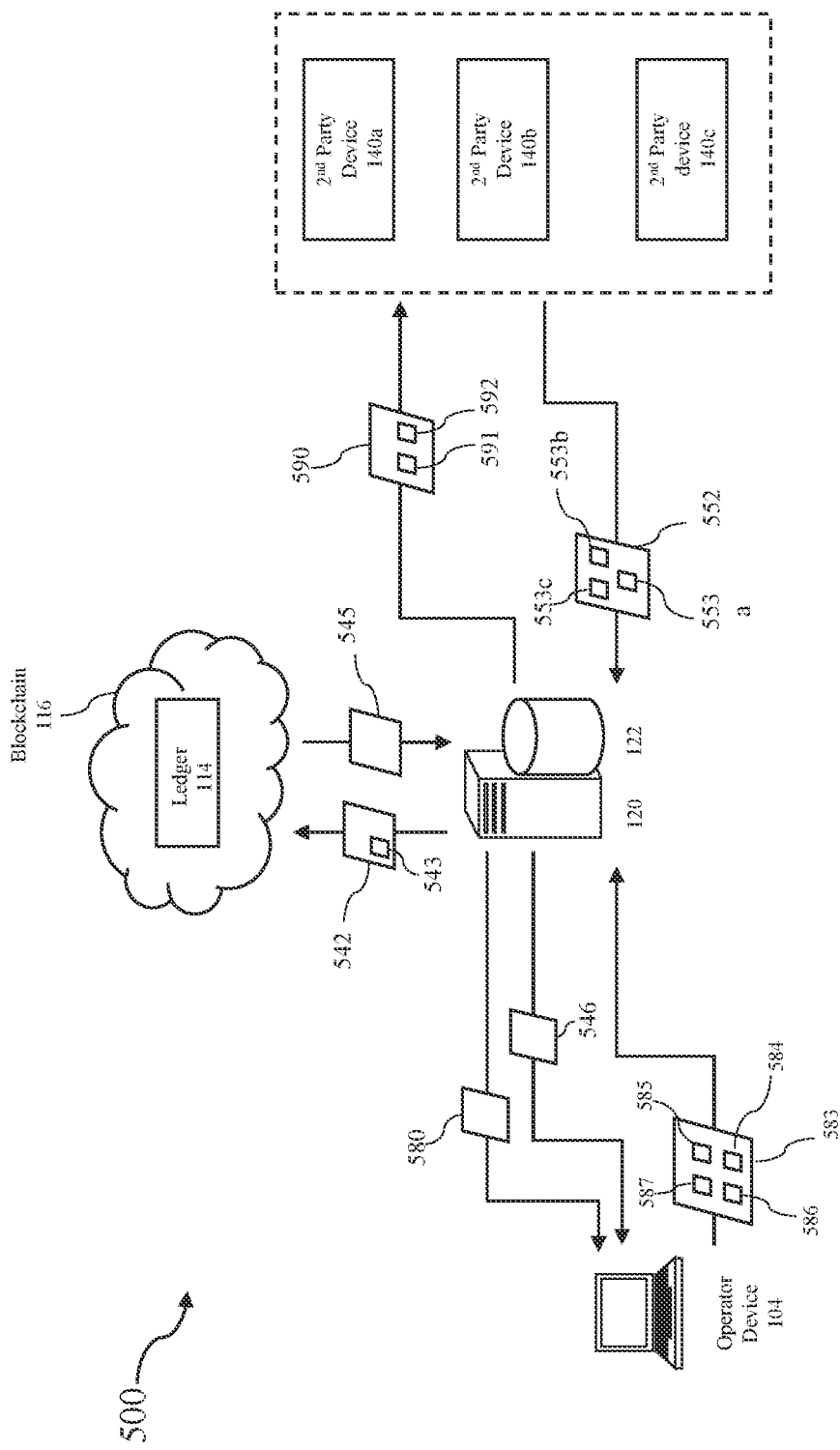
FIG. 5a is a schematic illustrating the flow of data in relation to example embodiments for updating an asset record.

In another example, and now with reference to the figures including FIG. 5a, operator 102 may be sent a second operator interface message 580 for updating an asset record. Operator 102 may respond with update request message 583. After receiving the update request message 583, server 120 may generate and send an authentication request message 590 requesting a plurality of second party devices (140a-140c) to authenticate the update request in update request message 583. The second party devices (140a-140c) may respond with a plurality of authentication request message responses 552. After receiving the responses 552, server 120 may send an update message 542 to blockchain 116 to appropriately update the asset record(s) on the ledger 114. The blockchain 116 may in turn respond with an update response message 545, which may be sent in a copy of the response message 546 to the operator's device 104.

Such exemplary communications described above may be sent via an appropriate protocol, such as via Hyper Text Transfer Protocol ("HTTP") and/or Hypertext Transfer Protocol Secure ("HTTPS"). Other transfer protocols may be used and are within the spirit and scope of the invention.

Server 120 may be in communication with database 122. The database may store a variety of data, including data associated with any of the aforementioned communications. Database 122 may permanently, or transiently store all or portion(s) of the data included in the aforementioned communications. In one embodiment, database 122 may be a relational database comprising a Structured Query Language (SQL) database stored in a SQL server, and may be distributed over one or more nodes or locations that are connected via network 101. Database 122 may accumulate data from the transactions that occur on system 100. The data from the transactions may be used, for instance, to train machine learned algorithms. For instance, machine learned algorithms for authenticating data may be produced from accumulated data.

System 100 also includes blockchain 116 comprising a ledger 114, such as an electronic ledger. A blockchain 116 is a peer-to-peer network for storing data. For the methods and systems described herein, the blockchain 116 is used to store a plurality of asset data, as well as signatures that ensure non-repudiation and data integrity of the asset data. In this way, the blockchain 116 may serve a consensus of replicated, shared, and synchronized digital data geographically spread throughout system 100. Computer nodes may maintain the blockchain 116 and cryptographically validate (further explained below) each new block and thus records relating to the assets (e.g., aircraft components) contained in the corresponding block. In one embodiment, ledger 114 includes a plurality of nodes stored in database 122 configured to independently operate, update, and replicate.

It will be appreciated by those of ordinary skill in the art that a blockchain is a distributed ledger, meaning that the ledger is spread across a plurality of devices in a kind of peer-to-peer network. In other words, the electronic ledger is distributed over a decentralized communications network. The blockchain ledger may be cryptographically secured and data can only be added to the blockchain. Asset records on the ledger may be updated, however, due to the nature of the blockchain the prior records are retained. In this way, a request to access an asset record is generally directed toward the most recent, up-to-date, asset record. However, previous asset record data may be accessed as well due to the nature of the blockchain.

Critically, any additions and/or transactions (i.e., newly created blocks) made to the blockchain are validated by other devices (e.g., plurality of second devices 140a-140c) in the network against one or more criteria defined by the blockchain protocol. The additions and/or transactions to the blockchain are only made final and added to the blockchain ledger after a consensus has been reached among the validating devices (e.g., second party devices (140a-140c)) on the network.

Figure 1A:
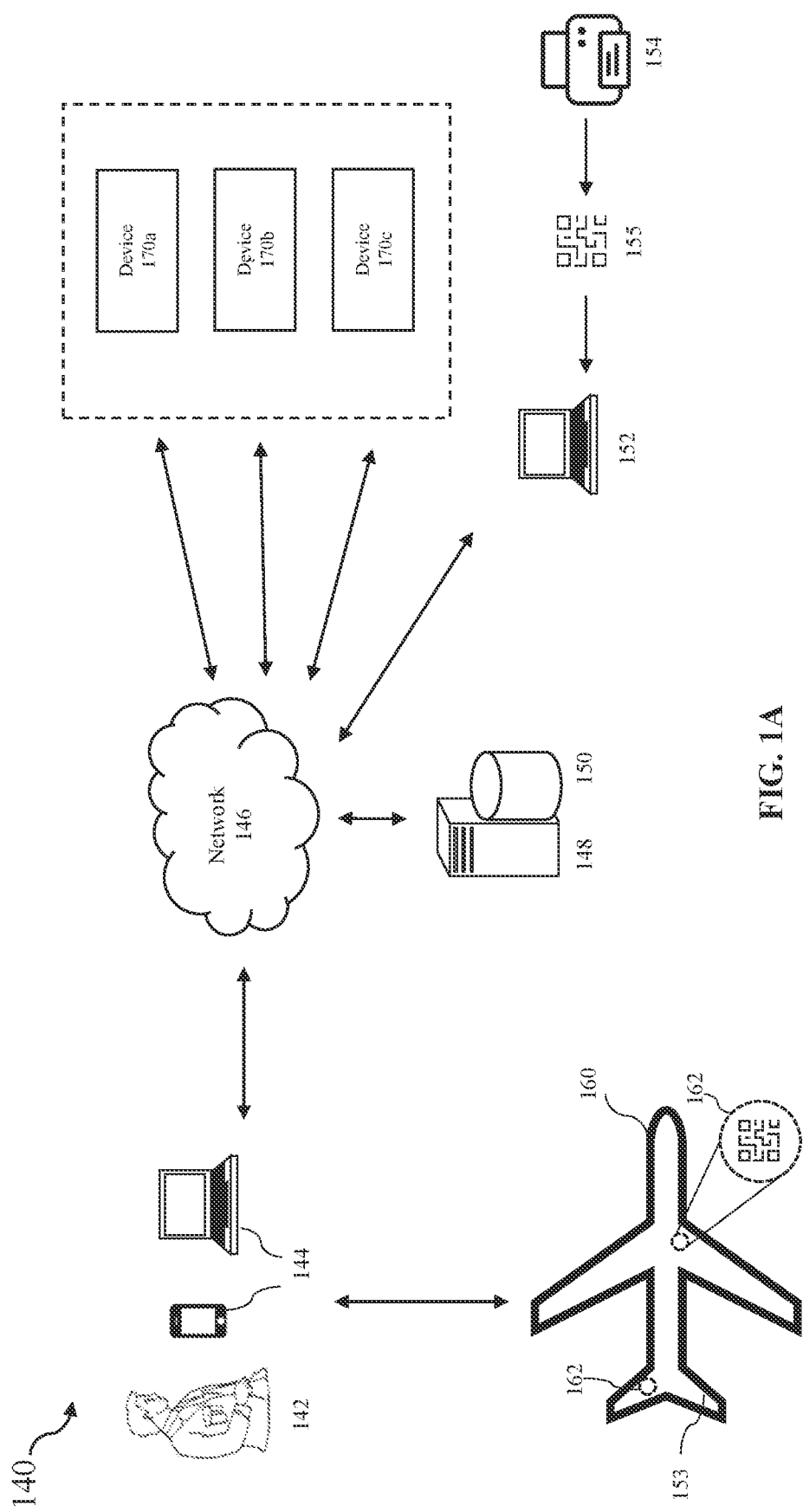
FIG. 1A is a block diagram illustrating a system for monitoring and certifying aircraft and aircraft parts, according to another example embodiment.

In another embodiment, a system 140 is shown in FIG. 1A that includes combination of hardware and software similar to the system 100. System 140 may include fewer or different components, and the division of work between the components may vary depending on the arrangement. For example, the system 140 may not have the blockchain 116 having the ledger 114 as shown in FIG. 1. In an embodiment, the system 140 may have an online ledger in a non-blockchain environment. The online ledger may be a digital system or a platform for recording, storing, and managing transactions, agreements, or other types of data in a secure and accessible manner over the internet without the use of blockchain or distributed ledger technology. The online ledger may use centralized databases and servers to store and manage data and can be accessed and updated by authorized personnel from multiple locations. System 140 includes a network 146 in communication with an operator 142 via the operator device 144, a device 152, a server 148 and database 150, and a plurality of third party devices 170a, 170b, 170c. As disclosed herein, the operator device 144 is also referred to as a first computing device, the device 152 is also referred to as a second computing device, and each of the plurality of third party devices 170a-170c is also referred to as a third computing device. Network 146 is similar to the network 101 of FIG. 1, and may include one or more packet switched networks, such as the Internet, or any local area networks, wide area networks, enterprise private networks, cellular networks, phone networks, mobile communications networks, or any combination thereof.

Figure 9A:
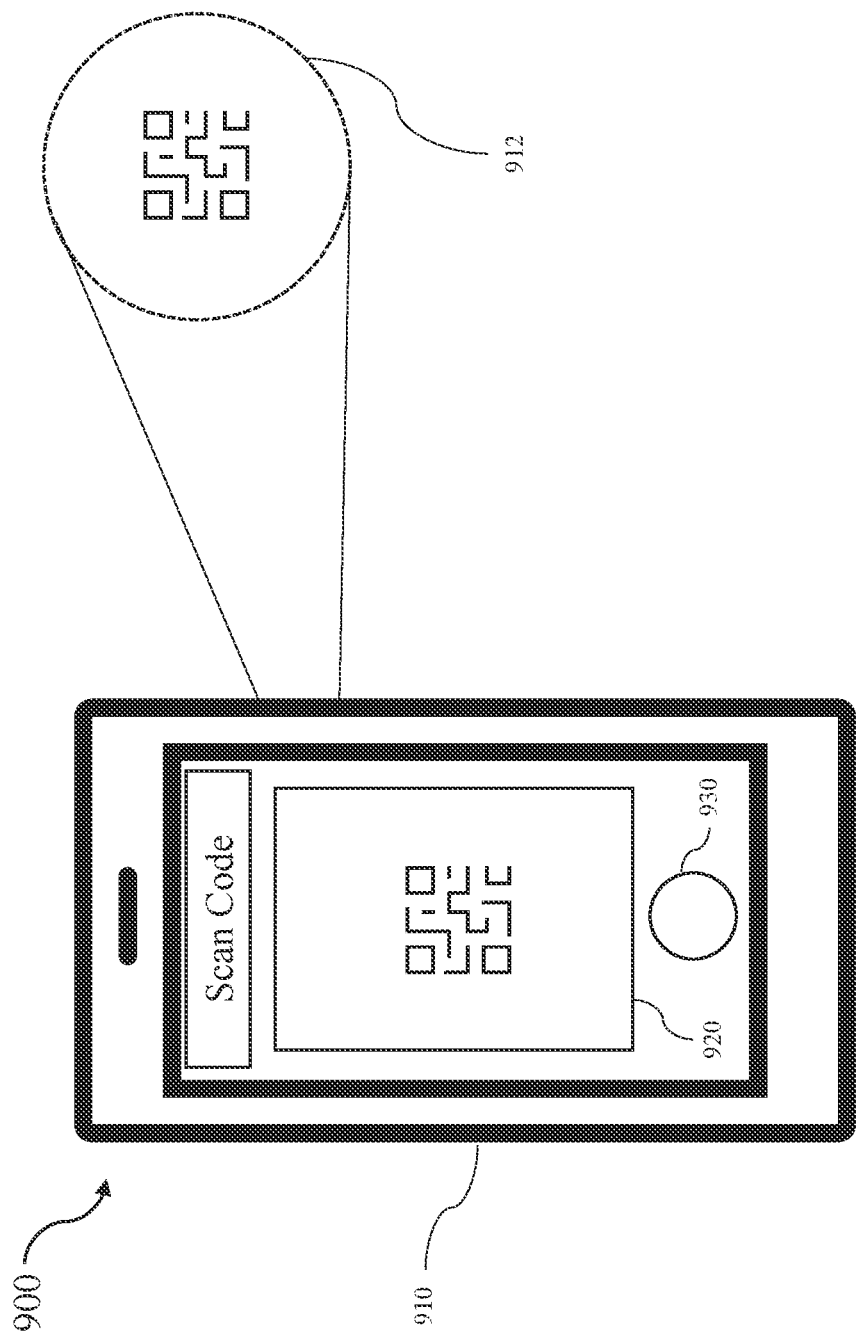
FIG. 9a is an example embodiment of an identifying mark interface for utilizing (e.g., scanning) an identifying mark to access asset record(s)

The plurality of third party devices 170a, 170b, 170c may be decentralized meaning the third party devices that are not in a single location or located on a single machine, as mentioned in reference to devices (140-140c) in FIG. 1. In an example, the operator device 144, the device 152, and the devices 170a-170c are any suitable computing device such as laptop computer, tablet computer, or a smartphone, a desktop computer and any other computing device used to access networks and software. The operator device 144, the device 152 and the devices 170a-170c may also be remote computing devices such as desktop computers and servers. The device 152, in an example, belongs to an entity or an organization that certifies and authenticates the asset records by verifying the service and maintenance data of the aircraft components. The entity also certifies and permits other entities, such as the operator device 144 to add or update asset records in the database 150 after authenticating the operator device 144. For example, the device 152 may provide the details and information about an asset in a QR code form, such as the identifying mark 162, affixed on an aircraft component to the operator. The operator device 144 may be understood to be used by different agents or at service centres distributed across different locations that are certified to add and update the asset record. In the example, the operator device 144 may receive and store the aircraft component and scan the bar code on the aircraft component using a device 104 (or device 910 as illustrated in FIG. 9a) to access the information related to the component. The devices 170a-170c may belong to an aircraft company or any third party interested in enquiring about the service and maintenance status of an aircraft components for components installed in their aircrafts or may intend to buy or replace an aircraft component with a new component and requires the service and maintenance record or other data regarding the component. It is understood that the current embodiment discloses asset record corresponding to the aircraft components. However, the asset record may also relate to any other type of data that may require certification and authentication and is covered within the spirit and scope of the invention. A software executed on these devices is for organizing, monitoring, and analyzing data associated with an identifying mark 162. The identifying mark 162 may store data regarding Aircraft Maintenance Manual (AMM), IPC, Trouble Shooting Data, Maintenance History, unique identifier associated with the asset, all Maintenance Release Paperwork, Traceability Data, Reliability Data, Warranty Administration, TSN/SO-CSN/CSO, and any other applicable data pertaining to aircraft 160 and/or aircraft components 153. In other embodiments, the identifying mark when scanned may include a unique identifier that allows the user to use the operator device 144 to access data regarding the asset stored on the asset record stored in the connected database.

System 140 has a printer 154, as shown in FIGS. 1A and 2A, similar to printing device 115 of FIG. 1 that generates a unique identifying mark 155. The identifying mark 155 is similar to the identifying mark 112 as shown in FIG. 1 generated by the printing device 115. The identifying mark 155 may be affixed to the aircraft 160 or aircraft components 153. The identifying mark 155 is affixed to two or more aircraft components 153 for identification of the aircraft components. Each unique identifying mark 155 is associated with a unique data element such as a record identification number corresponding to an asset. The identifying marks may be programmatically scanned to obtain information, such as asset records associated with the asset, which may be stored locally or on the connected database. The operator may scan the identifying marks on the aircraft components using the operator device 144.

Figure 8A:
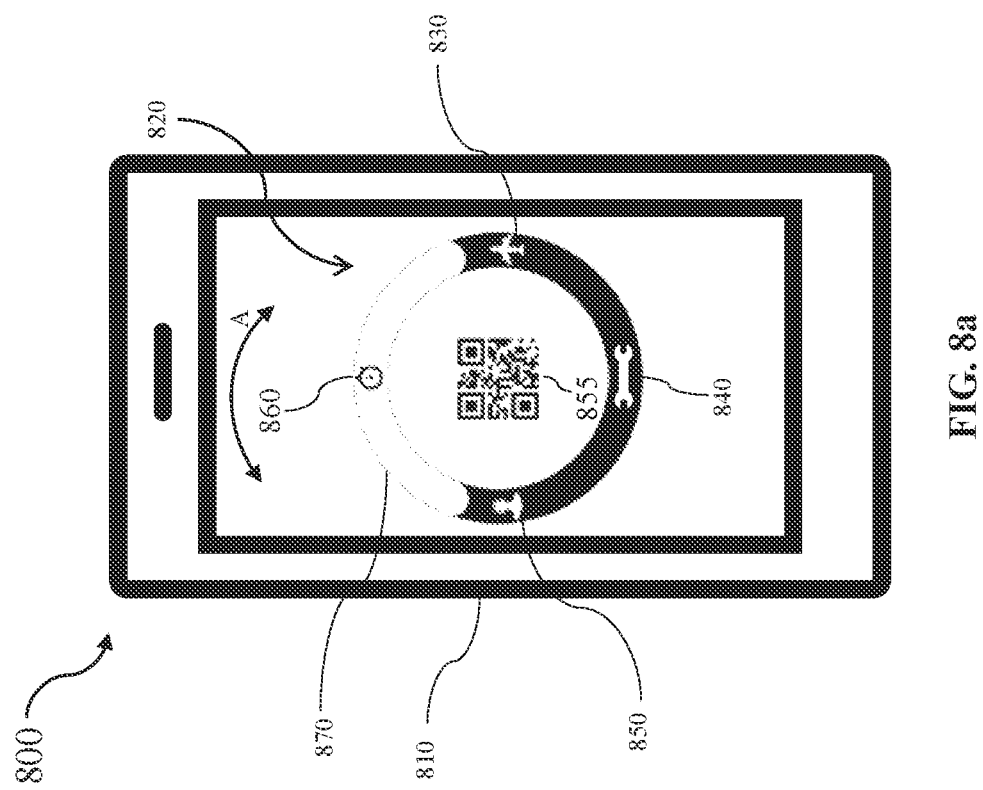
FIG. 8a is an example embodiment of a graphical user interface of an operator interface.

Referring to FIG. 8a, the operator interacts with an operator interface 800 to press a QR code icon 855 inside a ring or wheel-type graphical representation 820. After interacting with the QR code icon (such as with a button push, gesture, swipe, double click, etc.), the operator may be directed to an identifying mark interface, such as the identifying mark interface 900 shown in FIG. 9a. The interface opens a camera of the operator device 144 and allows the operator to scan or capture the identifying mark, which is a QR code. The identifying mark interface 900 allows the operator to quickly and easily access the asset records stored in the asset record stored on the asset database associated with a particular asset via the identifying mark 155. In one example the asset records may include matrix associated with attributes of the asset. Examples may include the tires of the aircraft, the rudder of the aircraft, flaps, stabilizers, and components of the aircraft engine. It is understood that other types of metrics associated with the asset may also be used and within the spirit and scope of the present invention. Additionally, the metrics may include dates, times, measurements, statistics, probabilities related to activities performed on an asset. For example, the last time the components of the aircraft engine were inspected the records and the servicing performed on these components any other notes maintained by the service operator. The asset records may also include data related to geolocation associated with a particular asset, an Illustrated Parts Catalog (IPC) associated with the particular asset and Component Maintenance Manual (CMM) associated with the particular asset. In an example, the asset record may also store ownership data for an asset. The ownership data may also include chain of ownership details for example data indicating dates of the transfer of ownership and the entities involved in the transfer of ownership in a chronological order.

In certain embodiments, the signature for any device including the device 152 and the operator device 144 may be generated based on several parameters. The parameters include, a device ID, a key of the device 152, an IP address of the device, geolocation data of the device, biometric data of a user of the device, time of scanning an asset, time of sending a request to a server, an asset ID, and geolocation of the asset. However, other parameters be used to generate the signature of the device.

In some embodiments, a request from any device including the device 152, the operator device 144, and the device 170-170c to access an asset record in the database comprises the information to identify the asset record. This information includes, one or more of a record ID, an asset ID, a geolocation data of the asset, and a component identifying data, including a component ID.

Figure 3A:
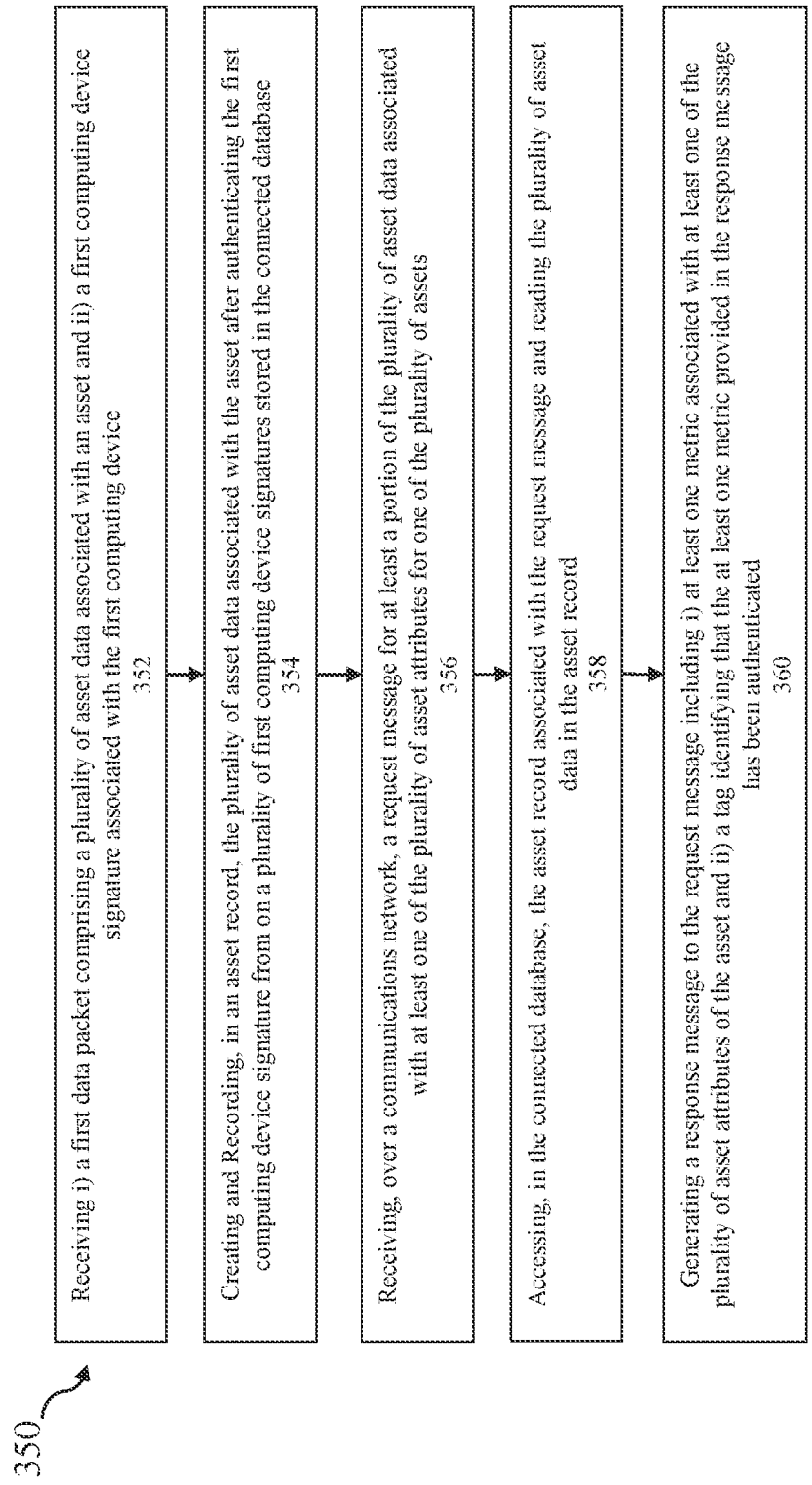
FIG. 3A is a block flow diagram of another example embodiment for creating and storing an asset record.

In an example, the entities and the devices shown in system 140 may communicate with each other over the network 146. Referring to FIGS. 2A, and 3A, in a data flow process 280, the server 148 may receive a first data packet 282, from the device 152, having a plurality of data 284, 286, 288 associated with a particular asset record to be added to the database 150 for creating an asset record. The data packet may comprise signature of the device 152 sending the asset data, unique asset identifier, including part number (e.g., manufacturer-provided part number), or other ID and geographic information of the asset and or the device 152. The unique asset identifier may be generally a string of characters and/or numbers, whereas identifying mark 112 is a graphical data identifier that may graphically represent the string of characters and/or numbers, and identifying mark 112 is a graphical data identifier that may graphically represent the string of characters and/or numbers.

Figure 7:
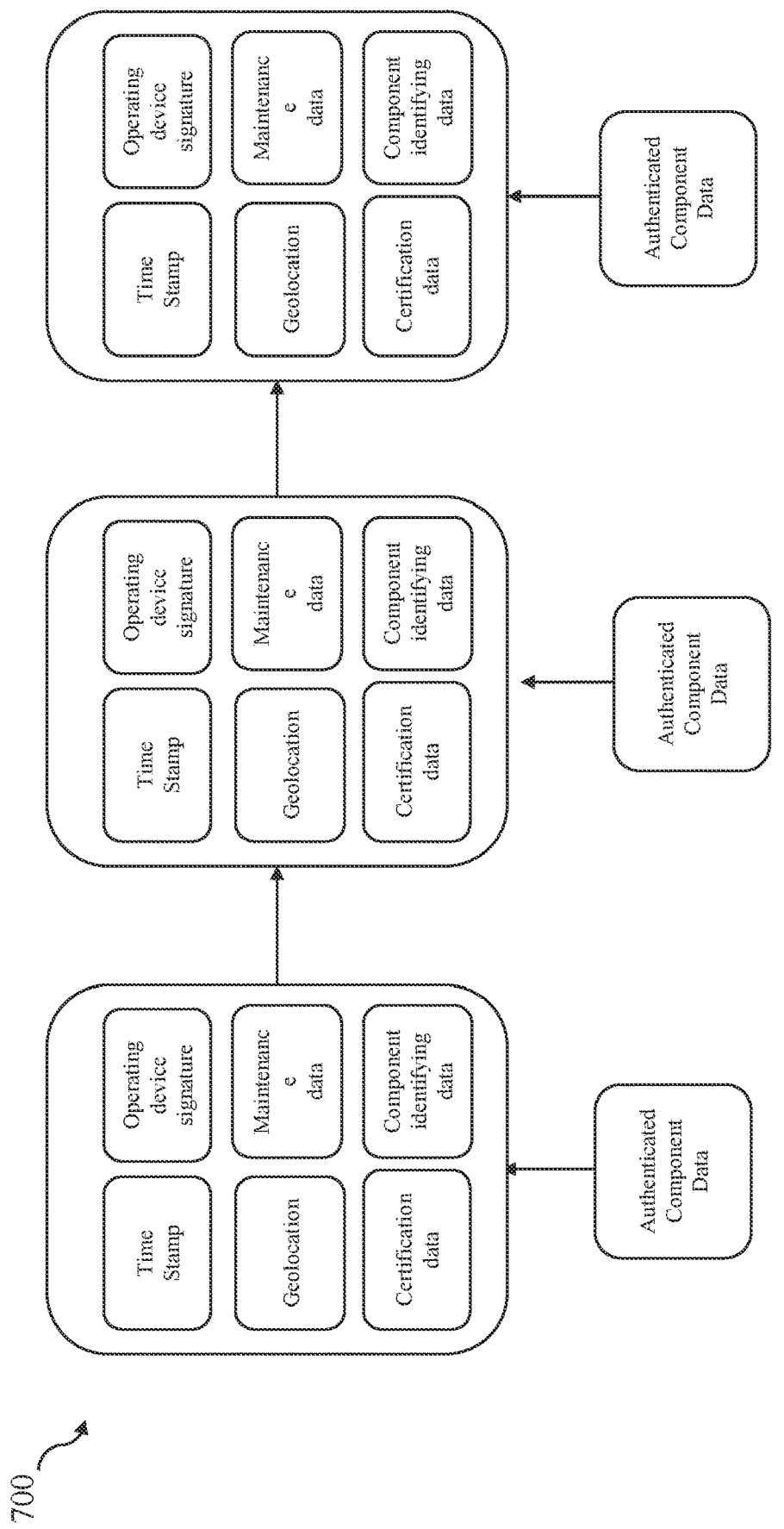
FIG. 7 is a block diagram illustrating a blockchain configured to be included in the system for monitoring and certifying aircraft and aircraft parts, according to an example embodiment.

In an embodiment, the asset record may also be created in the database by the device 152 when an operator device is not available in a particular geographic location for an asset. In such embodiment, when the device 152 creates or prints the identifying mark 155 and associates the identifying mark with the asset, the device 152 sends the first data packet to the server for creating the asset record. In step 352, the method includes receiving the first data packet 282 having asset data and a first computing device signature. At the server 148, whenever a data packet is received for adding an asset record or updating the asset record the data for authenticating the sender of the data packet is always provided in the data packet. Advantageously, the authentication information in the data packet provides the device sending the request to be easily verified and authenticated before adding or updating the asset record in the database 150 with increased data integrity. In an example, the database 150 is a central repository to store all the data associated with the asset record. The database may also have the online ledger to store and manage data associated with the asset records to be accessed by authorized parties or operators after verification and authentication. For example, the online ledger may be, as shown in FIG. 7 without the blockchain or a distributed ledger, that may store asset data related to timestamp, operating device signature, geolocation, maintenance data, certification data, and component identifying data. There may be additional data, such as IP address of the operator device 144, biometric data (not shown in the figure) stored in the online ledger. When creating the asset record, the asset data such as the signature of the device 152 creating the record, the unique asset identifier and part number may also be stored in the database for later authentication and verification of the operator device 144 for adding or updating the asset records in the database.

In certain embodiments, the authentication of a device signature is performed by comparing a signature profile of the device with the signature information of the asset stored in the database and the device 144 record stored in the attached database. The signature profile of the device may include information such as the signature of the device, the key received from the device 152, the geolocation data of the device 144, the timestamp of the time and date of scanning an asset or input of information to be updated or authenticated, and a timestamp of time and date of sending a request, the IP address of the device, the biometric data of the user of the device, and a device ID. The signature information of the asset, as described above, includes the signatures of authorized devices, the key, geolocation of the asset, the asset ID, and the component ID. For authentication, if the server determines that predefined number of parameters are acceptable, for instance the key of the signature profile matches with the key of the signature information, and other data such as time of sending the request and the geolocation are within the acceptable threshold, then the device is authenticated. In an example, for authenticating the device 144, the server extracts different information from both the signature profile of the device 144 and the signature information in the database and applies decryption algorithms to determine if the signature profile of the device is authenticated.

Referring to FIG. 2A, in response to receiving the first data packet 282 from the device 152, the server 148 may create and store the asset record(s) on the database 150. In an example, before creating the record, the server may authenticate the device 152 sending the first data packet based on the signature of the device. In an embodiment, when a record is created in the database, the record stores data related to the asset and the device that created the record, for instance the device 152. A single record in the database would include the device details, such as the device ID, the device signature, the geolocation of the device, and also the asset information including asset ID, the geolocation of the asset, and the component ID. This single record in the database has a record ID to identify the record that stores both the device information and the asset information. Each time the asset record is updated, then the information related to the asset is also updated.

In the method 350, the step 354 includes creating and recording the asset record after authenticating the device signature requesting to create and record the asset data. As disclosed herein, the device 152 creates the asset record in the database 150, however it is understood that, in other embodiments, the operator device 144 may also create the asset record in the database after a successful authentication of the operator device 144. In an example, as shown in FIG.

2A, the operator may request via the operator device 144 the key in the data packet 283 from the device 152, and the device 152 may authenticate the operator device 144 and share the key 285 in response to the request. In another embodiment, the device 152 may share the key 285 with the operator device 144 after creating the asset record in the database.

In one embodiment, the server may transmit an operator interface message 290 from the server 148 to the operator device 144. The operator interface message 290 generally includes information configured to display on an operator interface of the operator device 144. For example, a webpage or a user interface to show that the record has been created in the database along with a snapshot of the record created. The user interface may be record interfaces 870 or 880 shown in FIGS. 8*b* and 8*c* displaying additional data, such as timestamp information, geolocation, authentication ID, operating device signature, maintenance data and component identifying data. In another example, the operator interface message may display a data report 950 including columns of tabular data 960-965 in a data table 955 as shown in FIG. 9*b*, to be displayed on the operator device 144.

The operator interface, as displayed on the operator device 144, may be configured for receiving a user selection to generate an asset data record in the connected database or to generate an operator request to update asset data (e.g., aircraft component data) one of the particular assets recorded on the database. The operator may interact with an operator interface 800, with reference to FIG. 8*a*, that includes a ring or wheel type graphical representation 820. The ring- or wheel-type graphical representation 820 may enable the operator to toggle between various asset records. At the operator's direction, the operator may submit an operator request message in a data packet 291 using the operator interface. The operator request message in the data packet 291 may be a request to access an asset data in the database and includes data that may be used to authenticate the device sending the request, for instance, the operator device 144. The data may include the device signature for authenticating the operator device 144, an asset identifier to identify the asset that is to be accessed by the operator device 144, a geolocation data of the asset, a geolocation of the operator device 144, and an asset identifying data. However, as mentioned above other things may be used to authenticate the device 144. As depicted in the step 356 (illustrated in FIG. 3A; also step 310), a request message for a portion of the asset data associated with the asset is received by the server. It would be understood that in the present invention the operator device 144 or any other device is allowed to add and update the data in the database only after a successful authentication of the signature of the operator device 144 sending the request to the server.

For example, if the signature is not authenticated successfully, the request from the operator device 144 is denied and the data is not added or updated in the database (see FIG. 3, step 315). In one embodiment, for authentication, the server compares the signature profile of the operator device 144 in the request with the signature information (data related to device 144 and asset in the asset record) stored in the database to authenticate the request, as described above. If the signature profile is acceptable or is within a certain signature profile threshold, then the operator device 144 sending the request is authenticated and the asset record may be created or updated. As would be understood, the signature profile may include a key that is sent by another device, such as the device 152 that authenticates and permits other devices such as the operator device 144 to create and update the asset record. The key sent by the device 152 is used to generate the device signature for the device sending the request, such as the operator device 144. The signature profile of the operator device 144 should also meet a location threshold and a time threshold before they are permitted to create or update the asset record. For example, when the request to create or update the asset record is received, the server also receives the geolocation of the operator device 144 sending the request and compares the geolocation with the geographic location of the asset stored in the database. If the geolocation of the operator device 144 is within a predetermined radius of the asset geolocation, for instance within 500 metres-1 km, then the operator device 144 is determined to meet the location threshold. However, other distances may be used and are within the spirit and scope of the present invention.

The proximity of the operator device 144 to the asset is a factor that helps determine the veracity of the information provided by the operator device 144 sending the information. In an example, when the operator device 144 scans the identifying mark on the asset, the server receives a message from the operator device 144 that the asset has been scanned, receives a location information of the operator device 144, and the time of scanning of the asset in the message, and the time when the message has been sent. The geolocation of the asset may be assumed to be the same or within a predetermined radius of the device 144 if the message to add or update the asset data is received within a predetermined amount of time after information related to the asset is scanned by device 144 or input into an interface of device 144. For the time threshold, the server compares the date and time of scanning the asset by the operator device 144, or the date and time of when input is received about the asset, and the date and time of receiving the request from the operator device 144. When the difference between the date and time scanning of the asset, or input of data, and data and time the server receives the request is within a predefined threshold, such as 10 minutes-1 hour or one day depending upon the maintenance or servicing task, then the operator device 144 is determined to meet the time threshold. Based on the determination, whether the operator device 144 meets the location threshold or the time threshold, the server determines if the operator device 144 meets the signature profile threshold. If the signature is not within a certain signature profile threshold, such that the operator device 144 does not meet the location threshold and the time threshold, then the request is denied and the operator device 144 is informed of the denial of the request. It is to be noted, that the location threshold and the time threshold are crucial in determining data validity and integrity of the asset record stored in the database and ensure that the asset record in the database is from a device that is in the vicinity of the asset or has the possession of the asset and the data related to the asset record is recent and relevant to the current situation and not an obsolete data. This helps verify that the information being updated to the asset record is accurate and helps to determine that the veracity of the information provided by the operator device 144 is accurate.

As noted above, whenever the server receives a request from the operator device 144 to create or update an asset record, the location of the operator device 144 is also provided to the server. After receiving the location information, the server verifies the location information of the operator device 144 based on the previous location of the operator device 144 that has been stored in that operator device record. When the server determines that the location of the operator device 144 has changed, the operator device signature is regenerated based on the new location information and the key stored in the operator device 144. In an embodiment, upon determining a change in the location of the operator device 144, the server may also request a validation of the operator device 144 by sending a request to the device 152. In response, when the device 152 approves the operator device 144, the server proceeds to authenticate the operator device 144 and upon a successful authentication processes the request to add or update the asset record from the operator device 144.

Asset may continually move locations so device 152 may continuously monitor and record the location of the asset so that the location of the asset is updated in the asset record and stored in the connected database. As noted above, whenever the server receives a request from the operator device 144 to create or update an asset record, the location of the asset may also be provided to the server. After receiving the location information of the asset from device 144, the server verifies the location information of the asset based on the previous location of the asset that has been stored in asset record. If location of the asset has changed, the operator device signature is regenerated based on the new location information and the key stored in the operator device 144 and other information related to the device 144 signature. In one embodiment, when a data request that includes a request to update an asset record is received, then the server will query the connected database to determine if the location is within the predetermined acceptable threshold. In an embodiment, upon determining a change in the location of the asset, the server may also request a validation of the location of the asset by sending a request to the device 152. In response, device 152 may send a response with the location of the asset so that the server may use that information to authenticate the operator device 144 and to continuously and accurately track the location of the asset.

As shown in FIG. 2A, the server 148 may transmit a response message in a data packet 292, including an approval or denial, shown as data element 293, data element 294 to the operator device 144 request to create record or update data from the database 150. Along with the approval or denial, the server may also share the data table 955 as shown in FIG. 9b. Once approved, the server accesses the asset record in the database, shown in the step 358 in FIG. 3A and generates a response message that includes a metric associated with the asset attributes of the asset and a tag identifying that the metric provided in the response message has been authenticated. In FIG. 3A, in the step 360, the server generates a response message that includes the metric of the asset and the tag identifying that the metric has been authenticated. In an embodiment, the response may be generated to display the data on the operator device 144 in the form of a table such as the table 955 shown in the FIG. 9b, or in the form of record interfaces 870 and 880 displaying different asset data shown in FIGS. 8b and 8c. As disclosed herein, accessing the data is requested by the operator device 144, it is understood that accessing the data may also be requested by a third-party device such as the device 170a-170c, as explained in the paragraphs below.

The device 170a-170c may send a data packet 287 to the server 148 for requesting access to the data stored in the database. The data packet 287 may include the unique asset ID associated with the asset record that the device intends to access and other data, such as the device ID of the device 170a-170c. The server, after receiving the request data packet 287, may access the asset record in the database and generate a response to the request. The response may be sent in the data packet 289 from the server to the device 170a-170c. The response includes response message that includes the metric of the asset and the tag identifying that the metric has been authenticated.

In another embodiment, the operator 142 using the operator device 144 may also be required to update the asset record stored in the database 150. For example, the message for updating the asset record may include a change in date when an old component of an aircraft rudder was replaced with a new component. Referring to FIGS. 2A and 4C, the operator request message 295 for updating the asset record may be transmitted over the network and received by the server 148. The request for updating the asset record may also be sent by the operator by interacting with the operator interface 800 in FIG. 8a, in the similar manner as performed for accessing the asset record. The operator request message 295 may include a first portion of code 296 for updating at least a portion of (e.g., a metric associated with an attribute) an asset record from the database 150. A second portion of code 298 may include (i) the unique asset identifier, (ii) an operator device signature associated with the particular operator device, and (iii) the geographic location of the operator device (e.g., a global positioning system ("GPS") coordinate), (iv) time stamp of when the operator device scanned the code on the asset. Additionally, other information may be included as is within the spirit and scope of the present invention. As shown in the step 492 of FIG. 4C, the server may receive an update request message to update a metric of an asset data associated with an asset record. The update request message comprises, the unique asset identifier, the first computing device signature associated with the first computing device sending the update request message, and an unauthenticated data. In addition, message 295 or data packet may also include additional data, such as IP address of the operator device 144, geolocation data of the operator device 144, geolocation of asset (based on scanning asset or input data as explained above and below), or biometric data associated with the operator 142 of the operator device 144. Referring back to FIG. 2A, the server transmits the message 290 including a data packet that may be the second operator interface message for displaying the operator interface 800 on the operator device. In one embodiment, the server may then determine, to update the record of the assets, by authenticating the signature of the operator device 144 from which the update request message was received. In the step 494, the first computing device signature (the operator device signature) is authenticated.

For authenticating device 144, the server may compare the device signature with the information stored in the connected database. As mentioned above, to authenticate device 144, the following information may be cryptographically compared with the information stored in the attached database: a device ID of device 144, a key provided by device 152 to device 144, an IP address of the device 144, a Media Access Control (MAC) address of the device 144, geolocation data of the device 144, biometric data of a user of the device 144, date and time of scanning an asset or input of data, date and time of sending a request to a server, an asset ID, and geolocation of the asset. The authentication step 496 in FIG. 4C shows the first computing device signature being authenticated with the data stored in the database. As mentioned above and below, the signature of device 144 may change depending on the geolocation of the device 144, the asset ID and the asset geolocation. When authenticating device 144 or any other device, the server will use the information received in the request message from the device requesting to be authenticated (such as device 144 or 152), the data regarding that device requesting to update the data stored in that device's respective record in the database, the particular asset data stored in the connected database, and then authenticate the device 144.

In one example, when the server receives the request message, the server may apply a Multi-Factor Authentication (MFA) of the device 144 and first validate the device signature in the request message. For validating the device signature, the server may apply a decryption algorithm on the device signature to obtain the key, for instance the key received from the device 152 that is used for generating the signature information, and other information such as the geolocation data and the device information and asset information. Examples of decryption algorithm may include, Advanced Encryption Standard (AES), RSA Decryption, Diffie-Hellman Key Exchange, Triple Data Encryption Standard (3DES). Thereafter, the key obtained after the decryption is compared with the key stored in the database for a match. If there is a match, the server examines the device information, for example, the device ID of the device 144, the IP address and MAC address of the device 144 as mentioned above. The server compares the device information with device data stored for authorized devices or trusted configurations in the database to determine if the device information belongs to a device that is included in the data stored for authorized devices. Additionally, the server verifies the geolocation of the requesting device, and compares the geolocation with the location data of the asset stored in the asset record in the connected database to determine if the device 144 is within a specific distance, such as within a predetermined maximum radius from the asset. The device 144 is determined to be validated when the device is within the specific distance from the asset. Thereafter, the server may perform a biometric verification of the device 144 based on fingerprint or facial recognition data stored in the database for the authorized operators.

The server may then combine the results of the various authentication factors, such as the signature information, the device information, the location information, and user authentication, to make an overall assessment of the device's legitimacy. For example, the server may determine the device to be authenticated when the key in the signature information as decrypted matches with the key stored in the database, the location of the device is within the predetermined maximum radius, and the device ID belongs to a device stored in the database as authorized devices. In an example, after successful MFA, the server checks the device's access privileges and authorization to update the data in the database. The server may verify the access privileges based on access control policies and user or device roles stored in the database for different devices in a network. If the device 144 is determined to have access privileges to update the data, the device 144 is authenticated and the device 144 is allowed to update the data in the database. Once the device 144 is successfully authenticated and the data is updated by the device, the server logs the successful authentication and access activities for auditing and security purposes for the device 144. As disclosed herein, the authentication of the device 144 is performed based on MFA, it is understood that other techniques for authenticating devices in a network are also covered within the scope and spirit of the invention.

If the signature cannot be authenticated, the first computing device is not authenticated and the server proceeds to deny the update message request from the first computing device, as shown in step 497. As shown in FIG. 2A, the server 148 sends the authentication request message in a data packet 292 including an approval or denial, shown as data element 293 or data element 294 of the operator's 142 request to update an asset record to the database 150. Along with the denial or acceptance of the request the data packet 292 may include a record ID or a data report showing the record with other data, as shown in the data table 955 shown in FIG. 9b. In case the request to update the asset is denied, the process terminates. In an example, when the first computing device signature is authenticated based on a signature stored in the database, the first computing device is authenticated. Thereafter, the metric associated with the asset record is updated in the database as shown in the step 498. For updating the asset record, the operator device 144 may provide asset data to be updated or replaced in the database. For example, the operator 142 using operator device 144 to provide the server with a plurality of messages, such as a data packet 291. The data packet 291 may include the asset data for the asset record to be updated, such as an updated time and day for maintenance of a component, an updated component identifying data, including a component ID, or an updated certification data, device ID, location, authentication ID. After receiving the responses, server 148 may send an update message to the database 150 to appropriately update the asset record(s).

Ater updating the asset record, the server may send a message including data for the operator device 144 to display a report displaying various attributes such as a timestamp data portion 871 of last update, geolocation data portion 872, an authentication ID data portion 873, an operating device signature data portion 874, a maintenance data portion 875, and a component identifying data portion 876 as shown on record interfaces 870 and 880 of FIGS. 8b and 8c to be displayed on the operator device. In another example, the operator device may display a report such as the data report 950 including columns of tabular data 960-965 in the data table 955 as shown in FIG. 9b, to be displayed on the operator device 144. The tabular data shows the updated data that is updated in the database in response to the update request message from the operator device 144. In the step 499, a second database entry is recorded in the database. This second database entry identifying the first computing device signature that sent the update request message and the first computing device identifier of the first computing device.

As noted above, the invention discloses only authorized and authenticated operators to create or update the record in the database or the online ledger. In an example, the operators who are within a predetermined maximum radius of the geographic location of the asset indicating the possession of the asset by the authorized operator or the operators sending the request for updating within a predefined time interval from receiving the asset whose device signatures are authenticated qualify to add or update the records. As described with reference to FIG. 5a, these communications may be performed using appropriate protocol, such as via Hyper Text Transfer Protocol ("HTTP") and/or Hypertext Transfer Protocol Secure ("HTTPS") or via any other transfer protocols that are also within the spirit and scope of the invention.

In an embodiment, after the asset record has been created or updated in the database as described previously, the server may automatically review the asset records stored in the database as part of a periodic review and verification of the data stored in the database. The automatic review of the data, in an example, may be for backing up data, checking errors or warnings, monitoring performance of the database, and checking data integrity for the data. Based on the review of the data, the server may generate suggested maintenance tasks for the operator based on rules-based algorithms, machine learned algorithms, and combinations. In an example, the operator device may display an interface, such as a graphical user interface 1010 shown in FIG. 10*a*, including a notifying message 1040. The message 1040 displays a number 3 that indicates 3 maintenance recommendations that require the operator's review. With reference to FIG. 10*b*, the operator may select the notifying message 1040, and the operator may be redirected to a new interface, such as interface 1012. The maintenance recommendations interface 1012 shows three potential maintenance tasks that the operator should undertake before the aircraft is permitted to fly again. For instance, first recommendation 1043 is to replace the anti-collision lights of the aircraft.

Referring now to FIG. 7, an example 700 of blockchain 116 associated with ledger 114 is depicted. A block chain or blockchain is a distributed database that maintains a list of data records on the ledger. A block chain typically includes several nodes. Each of the nodes may be one or more computers, databases, data stores, machines, operably connect to one another. In some cases, each of the nodes or multiple nodes are maintained by different entities. Blockchain 116 typically works without a central repository or single administrator. The data records recorded in the block chain are enforced cryptographically and stored on the nodes of the block chain. A block chain provides numerous advantages over traditional databases. The nodes of blockchain 116 may reach a consensus regarding the validity of a record contained on ledger 114. Records are created by users using the block chain in its normal course of business, for example, when someone sends cryptocurrency to another person, blocks are created by users known as "miners" who use specialized software/equipment to create the blocks. In the present invention, the user may access the system or provide data configured to be associated with asset records, such information will be recorded on the ledger 114 on the blockchain 116 but only if a threshold consensus has been reached (discussed in greater detail below).

Figure 6:
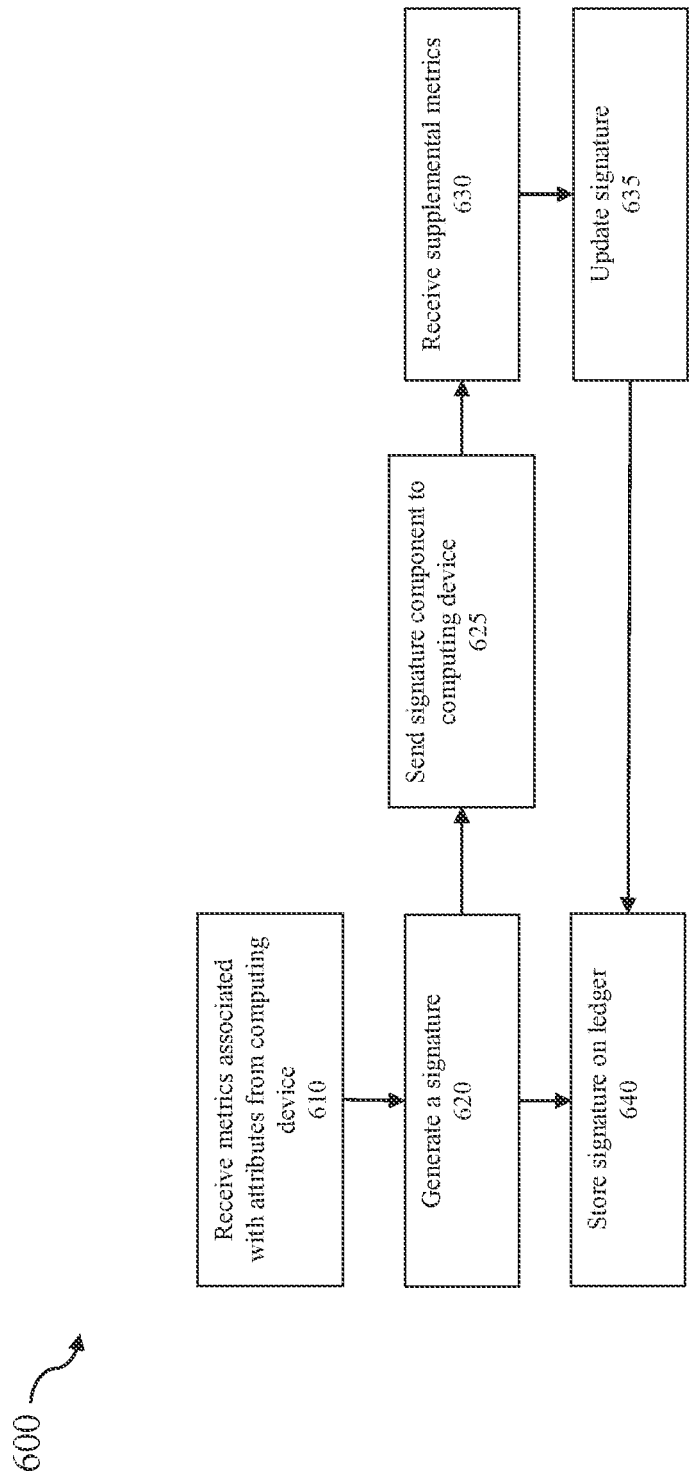
FIG. 6 is a block flow diagram for generating and updating a signature a computing device, according to example embodiment.

An entity such as an operator 102 may provide a cryptographic signature to ensure data integrity and non-repudiation of an operator's request. Other signatures, such as signatures from a first device 110 may also be implemented in the described methods and may similarly provide substantially the same benefits. One embodiment for providing a signature (not necessarily cryptographic) is discussed below in relation to FIG. 6. In one embodiment, cryptographic identities (e.g., cryptographic signatures), are generated using the Libsodium library, against the Ed25519 elliptic curve. In effect, this allows the ledger 114 to function as a ledger for storing information that is publicly available and the root of trust may be some trusted entity and/or certifying entity, such as the plurality of second party devices (140*a*-140*c*), which may also be authenticated according to the methods described in relation to FIG. 6.

ii. Methods

As noted above, the present invention relates to systems and methods for disseminating reports for a plurality of assets. More particularly, the present invention relates to systems and methods for disseminating reports (e.g., asset records) for aircraft assets (e.g., the aircraft itself, particular aircraft components). As will become apparent with the foregoing description, a first user may create an asset record for a particular asset. The asset is generally associated with some type of identifying mark (e.g., a printed, unique, identifying mark), and the asset record is stored on a ledger. After producing the asset record, an operator, such as an employee of an airline corporation, may desire to inspect the particular asset. An operator may also desire to update an asset record (e.g., to reflect the occurrence of maintenance). The systems and methods described herein allow for the creation of asset records, accessing the asset records, and updating the access records. Significantly, the systems and methods include methods for storing the data in a manner that ensures data integrity.

In one aspect of the invention, data integrity is ensured by providing signatures from the operator's device 104 and/or first computing device(s) 110 in the communications originating from those respective devices. The signature may provide non-repudiation and data integrity of a first data packet. Additionally, it is understood that each of the second computing devices providing a consensus may also include a signature that may also be recorded on the ledger 114. As previously noted, the signature may be a cryptographic signature, a non-cryptographic signature, and combinations thereof. In one embodiment, and with reference now to FIG. 6, a method 600 for generating a signature for a computing device associated with the system is shown. As illustrated, the method comprises a first receiving step 610. In first receiving step 610, metrics are received, by server 120, over the network 101. After the receiving the metrics step 610, the method includes a generating a signature step 620. The signature may be produced based on certain metrics associated with the computing device. For instance, metrics such as the particular device (e.g., a device ID, a record ID), the geolocation of the particular device, the internet protocol address ("IP address"), the time of day, and the frequency of information that is requested, the time of day requests are received from the device, among others. The unique signature produced in the generating step 620 may be a cryptographic signature or proof and may also not be a cryptographic signature. Furthermore, the signature may include cryptographic components and non-cryptographic components. Regardless, after the generating step 620, server 120 may send the signature to the computing device in a sending step 625. In this sending step 625, the server 120 may also request supplemental metrics. In receiving step 630, server 120 receives the supplemental metrics. Based on the received metrics, the signature may be updated in an updating step 635. After updating the signature in updating step 635, a signature update message is sent to blockchain 116 and ultimately, in step 640, stored on ledger 114. The signature allows the system to determine if the information received from the computing devices is authentic and allows for the non-repudiation of the data received. Additionally, graphical representations of the cryptographic signatures may also be included in the reports (as illustrated in FIG. 8*c*) to further help users to identify that a particular component number, or information related to a particular component, has been authenticated.

With reference now to FIGS. 2 and 3, a schematic 200 illustrating the flow of data and a method 300 for creating an asset record are shown. Using method 300, asset records for a plurality of assets may be produced and stored on a ledger 114 using a blockchain 116. As illustrated, the method comprises a receiving step 310. In receiving step 310, the server 120 receives a plurality of asset data 211, 212 from first computing device 110. Next, in step 315, the server will determine if the signature associated with the information received from the first computing device received in the data packet from first computing device has a signature that matches the first computing device signature of the first computing device, which may be stored in the attached database 122. As explained below, the first computing device may have been authenticated prior to the server receiving the information from the first computing device. If the signature of the first computing device does not match the signature of the first computing device stored in the first signature device record in the attached database, then the process moves to step 318 and the system may not record information related to a particular asset in a particular asset's record. On the other hand, if the first computing device is authenticated, then the process may move to step 320. The authentication step may also be performed by sending a data packet to the decentralized network of second party devices to each perform an authentication of the signature of the first device and may find that the first computing device's signature is authentic if a consensus between the plurality of second party computing devices has been achieved.

The plurality of asset data 211, 212 may be included in a first data packet 210. The first data packet, in one embodiment, may be sent via HTTP or HTTPS, preferably HTTPS. The plurality of asset data (211-212) may be associated with a particular asset, such as a particular aircraft, or an aircraft component. The first data packet may also include the signature of the computing device that sent the first data packet. By authenticating the signature, the data associated with the asset may be proven to be authentic. The plurality of asset data (211-212) may also include a unique asset identifier, as described above, such as a part number (e.g., manufacturer-provided part number), or other ID. The unique asset identifier is generally a string of characters and/or numbers, whereas identifying mark 112 is a graphical data identifier that may graphically represent the string of characters and/or numbers. The unique asset identifier may be advantageous to include in the asset record 223. For instance, the server 120 may be programmed to automatically associate useful information, such as a user manual, with the asset record 223 based on the unique asset identifier.

As mentioned above, the receiving step 310 may also include receiving a signature 213 from the particular computing device that sent the plurality of asset data, which as explained above may be included in the first data packet 210. As noted above, the signature may be a cryptographic signature or a non-cryptographic signature. In one embodiment, the signature may be associated with the first computing device 110. In one embodiment, the signature is from an operator's device 104. Regardless of the type of signature used, the signature may provide non-repudiation and data integrity of the data packet 210.

After the receiving step 310 and the authenticating step, the method 300 comprises a creating step 320. The creating step 320 comprises creating an asset record 223 on ledger 114. After the creating step, the method includes a storing step 330, where the asset record 223 is stored on the ledger 114. The creating step 320 may comprise, for instance, using server 120 to send a message 220 to the blockchain 116, the message comprising a first portion of code 221 to create the asset record on the ledger 114. Furthermore, as illustrated, message 220 includes a second portion of code 222, the second portion of code 222 comprising a plurality of asset data to store in the asset record 223. Thus, the creating step 320 and storing step 330 may occur simultaneously (e.g., concomitantly) or separately.

The storing step 330 may comprise recording, in the asset record 223, the plurality of asset data (211-212) associated with the particular asset. In one embodiment, the plurality of asset data (211-212) is recorded after authenticating the first computing device signature (discussed above). Furthermore, the method may include an assigning step 332, where a unique identifying data element is assigned to the identifying mark 112. For instance, the unique identifying data element may be a record ID. As a non-limiting example, a particular QR code (identifying mark 112) may be assigned a unique string of characters and/or numbers. As a non-limiting example, a part ID (e.g., originating from the manufacturer or part owner) comprised of a string of characters and numbers, such as AXW11134 may be assigned a particular QR code. After a user scans the particular QR code, the user's computing device may make a request to server 120 to obtain the asset record data having a corresponding part ID of AXW11134. In this way, the identifying mark 112 may be associated with a particular record ID, and in turn the part ID may be used to readily access asset records by requesting them from server 120.

Multiple unique identifying data elements may be included in an asset record. For instance, an asset record may include a unique identifying data element to identify the particular asset. An additional unique identifying data element may be included, and the additional data element may identify the asset that the particular asset belongs to. For instance, a first asset record may be an asset record for an aircraft, and a plurality of second asset records associated with components of the aircraft may be stored in the aircraft's asset record. The unique identifying element, such as an aircraft ID number, may be stored in the parent asset record, as well as the asset record of each individual component. In this way, scanning an identifying mark 112 to retrieve an asset record may retrieve a plurality of asset records. The scanning of the identifying mark 112 also provides the geolocation of the operator device as the operator device scanning the identifying mark on the asset is assumed to be in proximity of the asset, when the request to update the asset record is received within a predetermined time or the time threshold, for example 20 minutes-1 hour of the scanning. Server 120 may process the plurality of asset records associated with an entire aircraft and may make maintenance recommendations to the operator. Advantageously, the operator may be apprised of critical maintenance checks by simply scanning the unique identifying mark 112. An example of this is shown and described in relation to FIG. 10b.

FIG. 3A shows a method 350 for creating an asset record in a database and generating a response message to the operator device 144. The method includes receiving asset data for verification. The method 350 includes receiving step 352 for receiving a first data packet, such as the data packet 282 in FIG. 2A having a plurality of asset data associated with an asset and an operator device 144 signature associated with the operator device 144. The data packet 282 may include asset data 284, 286 and 288 that includes the signature information of the operator device 144 sending the data packet, the signature information includes the key, the geolocation of the operator device 144, the IP address of the operator device 144, the location of the asset, the unique asset identifier associated with the asset, timestamp of when the asset was scanned, the location where the asset was scanned, the time of when the request was sent, information about the asset to be updated. As would be noted, the signature information of the device 152 is stored in the database for later use when the server authenticates the operator device 144 sending requests for creating or updating asset records. The signature information stored in the database is then compared with the signature information of the operator device 144 sending these requests to approve or deny these requests. In an example, the asset data may also include service and maintenance data, corresponding to the aircraft components of the aircraft. The asset data may also include the metrics including measurements, dates, times, quantities, statistics, probabilities, alphanumeric characters, colors, shades, etc. related to the asset. In step 354, the method 350 includes creating and recording an asset record in a connected database. The record may be created by the server 148 in the database 150. In an example, after creating the asset record, a record ID may be generated for the asset record by the server to uniquely identify the asset record in the database. The creating and recording of the plurality of asset data is performed after authenticating the operator device signature. For authenticating the operator device signature, the server 148 compares the operator device signature with a plurality of operator device signatures stored in the connected database if the signature profile is within a predetermined threshold, then, the operator device is authenticated. In an example, additional data such as an IP address or a biometric data of the operator device may also be used for authenticating the operator device. In one example, the biometric data may include fingerprint data, or facial recognition data of the operator 142 of the operator device 144. The additional data may be used to authenticate the operator device 144 along with the geolocation data when the operator device is adding or updating an asset record in the database 150. The additional data may also be used along with the geolocation and the key in generating the signature for the operator device 144. In an example, the plurality of asset data is stored in the assets record. In step 356, the method 350 comprises receiving over a communication network a request message for portion of the plurality of asset data associated with the plurality of asset attributes for one of the plurality of as sets. For example, the server may receive the request message in the data packet 291 from the operator to access the portion of the asset data. The method 350 comprises an accessing data step 358 for accessing the asset record associated with the request message and reading the plurality of asset data in the asset record. The asset record associated with the request message is accessed in the connected database. In the next step 360, the response message is generated to the request message based on the plurality of asset data in the asset record. The response message includes one metric associated with at least one of the plurality of asset attributes of the asset and a tag identifying that the metric provided in the response message has been authenticated.

In an operating example, the server receives a first data packet comprising asset data relating to one of an aircraft engine, a rudder of the aircraft, and a component of a wing of the aircraft, such as a flap, a winglet, or a spoiler. Referring to FIG. 3A, the server receives the first data packet in the step 352. Along with the asset data the first data packet may also have the operator device signature that is associated with the operator device 144. The signature indicates that the device is certified and authenticated to provide the asset data, and the data packet can be stored in the database. As noted above, when a data packet is received for adding an asset record or updating the asset record, all the information for authenticating the sender of the data packet and identifying the asset record are provided in the data packet. For instance, the signature profile comprising the key, the signature, the geolocation data of the device, geolocation of the asset (based on information scanned or input into an interface on operator device 144), and additional data such as IP address or biometric data, and the unique asset ID, time stamp of when the operator device has scanned or input was received into operator device 144 was received related to the asset. After receiving the first data packet, the server creates and records an asset record in the connected database as a database entry in the step 354 and stores all the information provided in the data packet in the database for later use. For example, the geolocation of the asset is stored in an asset record in the database and is later used to compare the location of the operator device with the location of the asset records stored in the database when the operator device sends a request to create or update the asset record to validate the request. The server then compares the operator device signature with the signatures stored in the connected database to authenticate the operator device signature. The signature may also be authenticated based on comparing the additional data such as the IP address of the operator device or the biometric data associated with the operator 142 of the operator device 144 with the IP address and biometric data stored in the database. If the signature is authenticated, the server determines that the operator device signature received in the first data packet is valid and authenticated. After authenticating the operator device, the server records plurality of asset data associated with the asset, such as date, time, statistics, service data, service record, ownership data related to the asset. At this stage, the database is populated with the asset record and available for querying by any other computing device regarding information of the aircraft components. After the record has been created in the database, the server receives a request message over the communication network for a portion of the plurality of asset data associated with the asset attributes for one of the assets, in the step 356. The request may be received from the devices 170a-170c to request information about the flaps and spoiler of the wing of the aircraft. After receiving the request the server reads and accesses, in the step 358, the asset data in the asset record and generates response message to the request message based on the asset data in the asset record in the step 360. The response message includes for example dates of when the flaps and spoiler were serviced, details of servicing and maintenance, such as cleaning, oiling, replacement of a part, etc. and information to identify that the flaps and spoiler conform to a set standard for use in the aircraft. In addition, a tag to identify that the metric provided in the response message is authenticated is added in the response. As noted above, a webpage or a user interface to show that the detail regarding the record is displayed on the user interface of these devices. The user interface may display additional data, such as timestamp information, geolocation, authentication ID, operating device signature, maintenance data and component identifying data, shown in FIGS. 8b and 8c. In another example, the response message may display a data report 950 including columns of tabular data 960-965 in a data table 955 as shown in FIG. 9b, to be displayed on the device 170a-170c. The response message as displayed is mainly in a read only version that may only be read by these devices and these devices do not have the rights to edit or delete the content of the response message.

Figure 4:
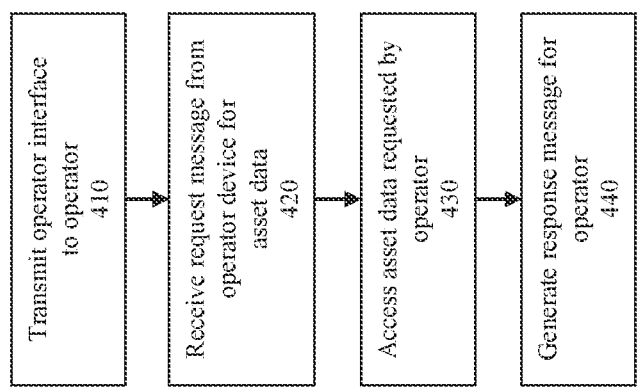
FIG. 4 is a block flow diagram of an example embodiment for accessing, by an operator, an asset record on the ledger.

With reference to the figures now including FIG. 4, a method 400 for an operator to update an asset record is shown. It is understood that the method 400 is used to update the asset record in an online ledger in a non-block chain environment. The online ledger may be a digital system or platform for recording, storing, and managing transactions, agreements, or other types of data in a secure and accessible manner over the internet without the use of blockchain or distributed ledger technology. The online ledger typically relies on centralized databases and servers to store and manage data, for example for tracking sales, inventory levels, and component data. This ledger is stored on a central server and can be accessed and updated by authorized personnel from multiple locations. In an example the online ledger may store data related to time stamp, geolocation, certification data, operating device signature, maintenance data, and component identifying data. The method includes a transmitting step 410 that includes transmitting, over the network, to an operator interface to one or more operator computing devices. The transmitting may include transmitting an operator interface message 230 from the server 120 to the operator device 104. The operator interface message 230 generally includes information configured to display an operator interface. The operator interface may be configured for receiving an operator request for asset data (e.g., aircraft component data) for one of the particular assets recorded on the ledger 114 if the information from the operating computing device is authenticated. Lastly, each operator computing device may be associated with a unique operator computing device signature, which may be stored in the database 122, or may be available or stored in the authenticating second party computing devices.

FIG. 4A illustrates method 450 for generating a signature from a key and geolocation data. The first step 455 includes receiving data for the signature from the first computing device, for instance the operator device 144, including the geolocation data acquired from device 144. The geolocation data, in one example, may include the geographical or positional coordinates of the operator device at a particular location, such as GPS coordinates. The data may also include the device ID of the first computing device which is a unique ID of the device. In an example, for generating the signature, additional data, such as an Internet Protocol (IP) address of the operator device, biometric data such as fingerprint or facial recognition may also be received and combined with the geolocation data for additional security and authentication. In the next step 460, a key is received from the second computing device, such as the device 152. In an embodiment, as shown in FIG. 2A, the key 285 may be provided by the device 152 in response to a request in the data packet 283 for the key shared by the operator device with the device 152. In another embodiment, the device 152 may share the key 285 with the operator device 144 after creating the asset record in the database. The key may be a private or a public key or a unique password from the device 152. In an embodiment, the key may also be stored on the first computing device (operator device 144) after receiving the key from the device 152. Storing the key on the operator device facilitates regenerating the signature whenever required, for instance when there is a change in the location of the asset or the operator device 144. After receiving the key, a hashing function may be applied to the data and the key received from the device 152. However, other embodiments may be used for creating unique signatures using different data elements. For example, the unique signatures can be created based on different combinations of the data elements for example, in one combination the signature may be created based on the key and the geolocation data, in another combination the signature may be created by combining the key, the geolocation data, the IP address, and the biometric data. In another example, the first computing device signature may be generated by combining data elements in any number from the group comprising the key, the first computing device identifier, a first computing device location, a first computing device IP address, asset location generated based on scanning the asset. In the next step 465, the key and the geolocation data is provided to a signature algorithm. Some of the known signature algorithms may be used, for example, Rivest-Shamir-Adleman (RSA), Digital Signature Algorithm (DSA), Elliptic Curve Digital Signature Algorithm (ECDSA), Edwards-curve Digital Signature Algorithm (EdDSA), Hash-based Message Authentication Code (HMAC), Schnorr Signatures. In the next step 470, the signature is generated.

Figure 4B:
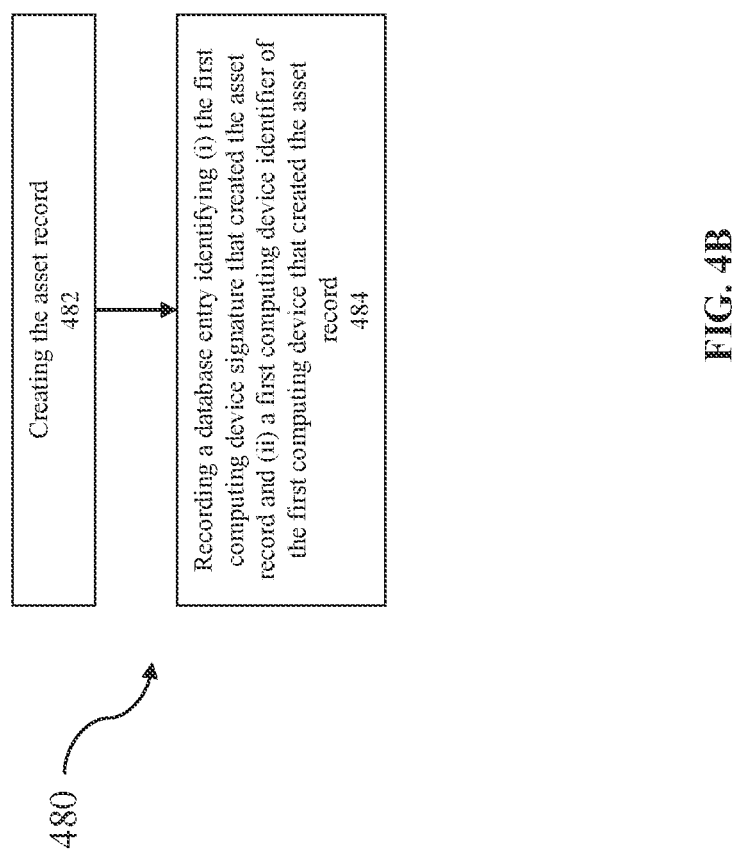
FIG. 4B is a block flow diagram of another example embodiment for recording, by an operator, a ledger entry.
Figure 4C:
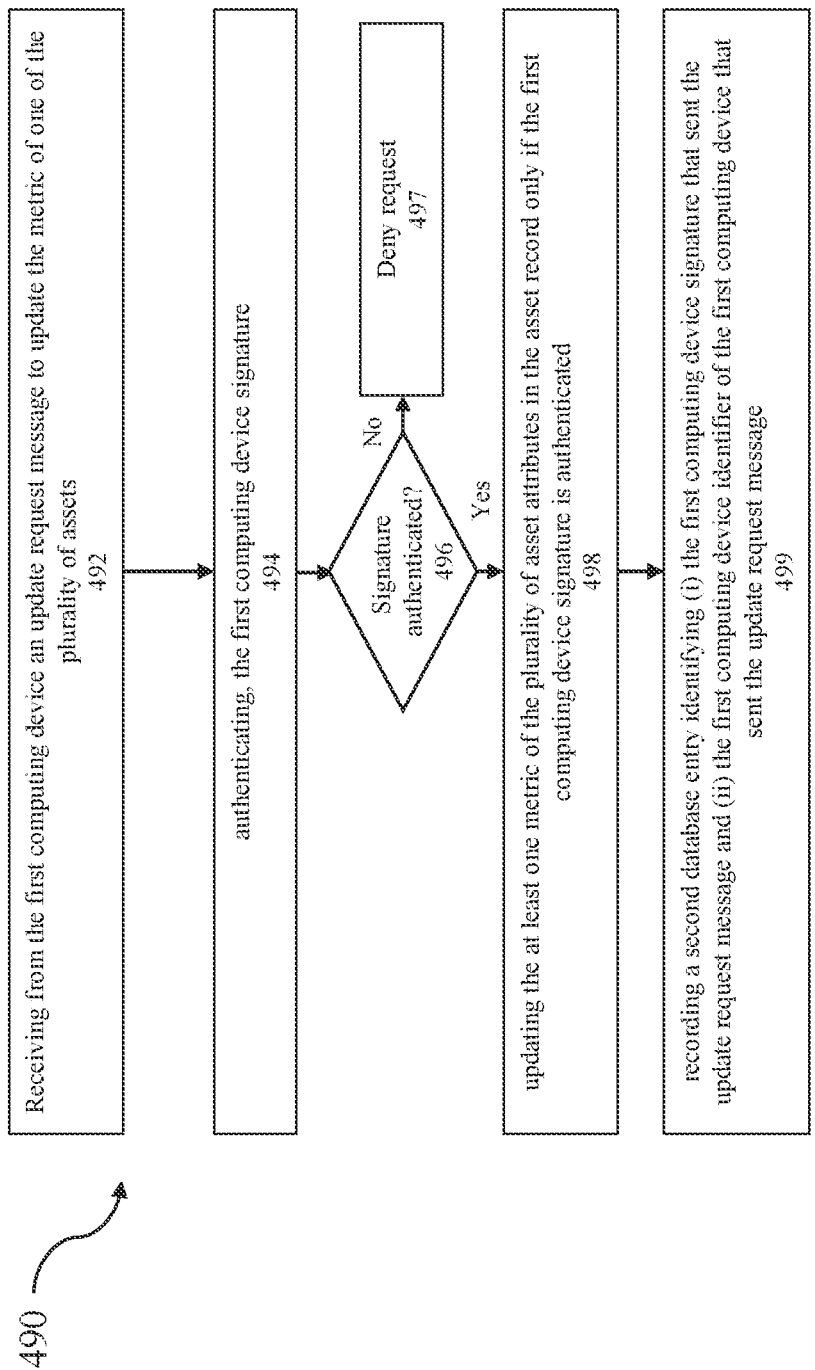
FIG. 4C is a block flow diagram of an example embodiment for recording, by an operator, a second ledger entry.

FIG. 4B illustrates a method 480 for recording additional data in the database after creating the asset record after authenticating the signature of the operator device transmitting the information to be updated. In an embodiment, as described above, the operator device 144 may also create the record in the database. In the step 482, an asset record is created. The asset record is created and stored in the database and information related to the asset record are also saved in the database. In the next step 484 additional data identifying the signature of the operator device 144 that created the asset record and the identifier of the operator device 144 that created the asset record is also recorded in the database as a database or ledger entry.

Figure 6A:
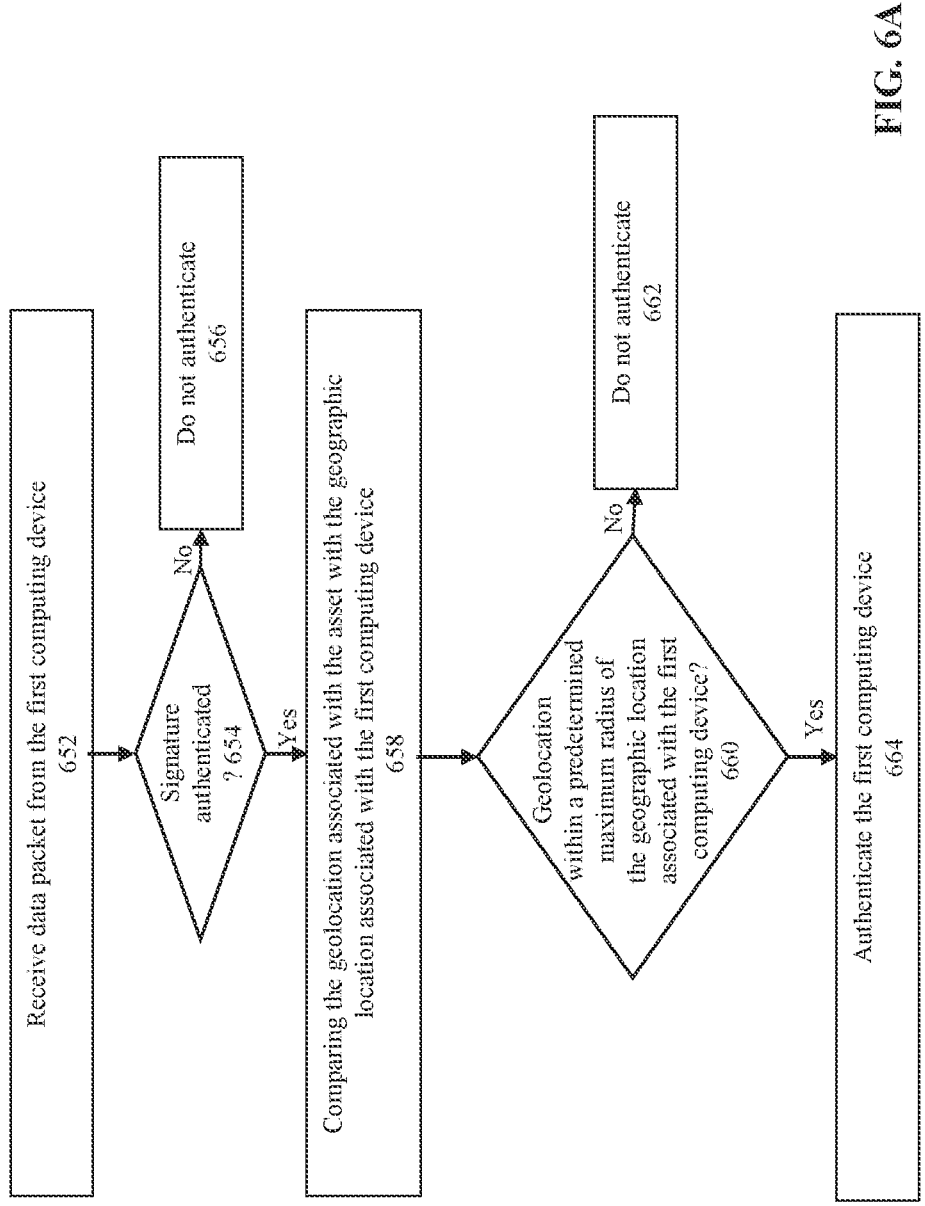
FIG. 6A is a block flow diagram for authenticating a computing device, according to another example embodiment.

FIG. 4C illustrates a method 490 for updating the asset record. In the step 492, an update request message is received from the first computing device, such as the operator device 144, over the communications network. The update request message is for updating the metric of one of the plurality of asset attributes of the plurality of assets and comprises a unique asset identifier, the first computing device signature associated with the first computing device, and unauthenticated data. The unauthenticated data may include, for instance, service and maintenance data, corresponding to the aircraft components of the aircraft. The unauthenticated data may be the asset data including the metrics including measurements, dates, times, quantities, statistics, probabilities, alphanumeric characters, colors, shades, etc. related to the asset. In the next step 494, the first computing device signature is authenticated. The first computing device may be authenticated based on comparing the first computing device signature with the signatures stored in the database, and asset information stored in the attached database related to asset. In this step 496, the first computing device signature is authenticated. If the first computing device signature is not authenticated then in the step 497 the request for updating the asset record is denied and the method terminates. In an example, the signature is also authenticated based on comparing the geolocation data as shown in method 650 of FIG. 6A. In the method 650, the data packet is received from the first computing device, such as the operator device 144, in step 652, and the signature is authenticated in the step 654. If the signature is not authenticated in the step 656, then the method is terminated. If the signature is authenticated then the step 658 of the method 650 includes comparing the geolocation associated with the asset with the geographic location associated with the first computing device. If the geolocation is determined to be within a predetermined maximum radius of the geographic location associated with the first computing device, in step 660, then the first computing device is authenticated in the step 664. If the geolocation is not within the predetermined maximum radius of the geographic location, then the operator device is not authenticated in step 662.

Referring to FIG. 4C, if the signature is authenticated, the method 490 includes the next step 498 where the metric of the priority of asset attributes in the asset record is updated only if the first computing device signature is authenticated. Subsequent to this a second database entry identifying the first computing device signature that sent the update request message and the first computing device identifier of the first computing device that sent the updated request message is recorded in the step 499. As would be understood, only authorized and authenticated operators are permitted to create or update the record in the database or the online ledger. The operators who are within a predetermined maximum radius of the geographic location of the asset indicating the possession of the asset by the authorized operator or the operators sending the request for updating within a predefined time interval from receiving the asset whose device signatures are authenticated are allowed to add or update the records. As an advantage, the disclosed method prevents fraud or misrepresentation of the assets by the operators and enhances reliability of the data shared with the third-party devices, such as 170*a*-170*c*. As described above, the tag provided to the devices with the response to access the asset records from the devices certify that an authenticated and authorized operator provides the information thereby improving trust and integrity of information provided to the devices 170*a*-170*c*.

In an embodiment, the server 148 maintains a list of operators and third-party devices that are authorised and authenticated by the device 152 and stores all the information regarding the signatures of these devices including the respective keys, the location of the devices, the device IP addresses, and biometric data associated with the users of these devices. When a request for creating or updating an asset record is received, the server always verifies if the device sending the request is within the same location as the asset, and is sending the request within a predefined time period from the scanning of the identifying mark on the asset. The server also periodically monitors the resources available with the operators, such as profiles of workers who perform maintenance and servicing, appropriate training of workers employed in a facility of the operators, regular and timely maintenance and servicing of the asset, appropriate certification of the workers and equipment used for servicing the asset, and any update in training required for the workers. Advantageously, the tag provided to the devices certify that the information stored in the database is most recent and relevant data, and is from devices that are duly verified, authorized, and have appropriate competence and resources to perform maintenance and servicing of the asset thereby enhancing reliability of the data.

Figure 6B:
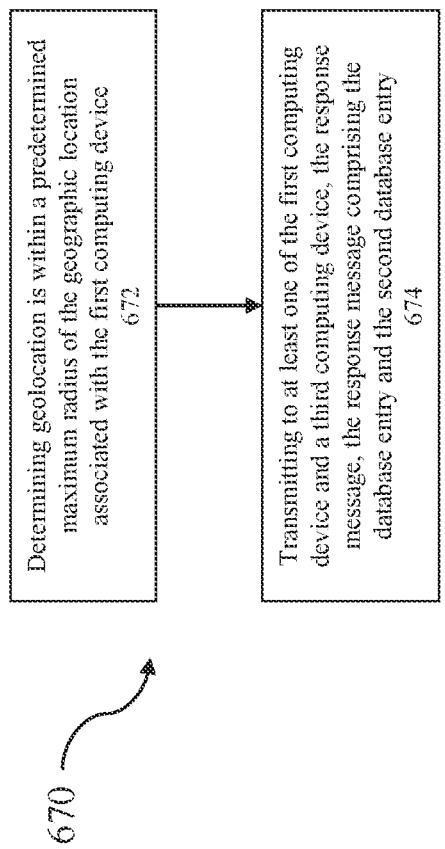
FIG. 6B is a block flow diagram for transmitting a response message to a computing device, according to an example embodiment.

FIG. 6B illustrates a method 670, where whether the geolocation is within a predetermined maximum radius of the geographic location associated with the first computing device is determined in the step 672. If the geolocation is determined to be within the predetermined maximum radius, then a response message is transmitted to one of the first computing device and a third computing device in this step 674. The response message comprises the database entry and the second database entry. In an example, the first database entry is when the asset record is created and the second database entry is when the asset record is updated based on the update request from the first computing device.

With reference to FIG. 8*a*, a particular operator interface 800 is shown. The interface depicted on computing device 810 may allow a user to toggle between various components of information relating to an aircraft and/or components of said aircraft. As illustrated, the operator interface 800 includes a ring- or wheel-type graphical representation 820. The ring- or wheel-type graphical representation 820 may enable a user to toggle between various asset records. The toggling may occur by, for instance, rotating the wheel via a screen gesture, such as a swipe, push, or other screen gesture means for rotating and selecting from the ring/wheel.

The user can readily access the asset record for the aircraft by selecting icon 830, or components of the aircraft by selecting icon 840. As mentioned above, the interface may provide a wheel type interface for rotating the wheel type interface in direction of arrowed line A, such that the desired icon to select (860, 850, 840, 830) is positioned at the top or upper part of the ring- or wheel-type graphical representation 820. This graphical interface provides a graphical representation or experience that certain users may find easier to use, and as a result, are more likely to use than other interfaces. Inside the ring- or wheel-type graphical representation 820, a QR code icon 855 is shown. The operator may press or interact with the QR code icon 855 to scan an identifying mark 112 on a particular aircraft or aircraft component. See the below discussion in relation to FIG. 9*a*. Additionally, the user may select operator icon 850 to review their operator data (e.g., signature, geolocation) or other data associated with the device of the operating device, and the user may select icon 860 to see previous provenance data associated with the aircraft. Provenance data generally includes the data associated with any asset record access, ownership data, asset record updates, and authentication data associated with the same. The operator can review the provenance data to determine how and when the asset record(s) have been accessed, updated, or otherwise interacted with on the ledger. This interface is unique because it allows the user to easily maneuver through, inter alia, authenticated asset record(s) on the ledger using a remote computing device.

With reference now to FIG. 9*b*, a graphical user interface of a provenance data report 950 is shown on remote computing device 910. As illustrated, the provenance data report 950 includes a plurality of columns of tabular data (960-965) in data table 955. The data table 955 includes a type column 960 (i.e., what type of transaction occurred on the ledger), a date column 961, an ownership ID column 962, an authentication ID column 963, a part ID column 964, a device ID column 965, and a device location (e.g., geolocation) column 966. The provenance data included in provenance data report 950 may inform an operator about how the asset record has been changed. For instance, in the type column 960, the initial record is an "add" type, meaning that the asset record was added to the ledger. In the subsequent data row, the second record is of an "access" type, meaning an operator (device ID: DEN1032) accessed the records. In the last row, the record is an "update" type, meaning the asset record was updated in that transaction. An operator interface like the provenance data report 950 or similar interfaces may be advantageous for an operator to have. Although the systems and methods described herein are recognized as ensuring data integrity, the operator can readily review the data and determine if the data is appropriate. For instance, the part ID of the data table 955 may be incorrect. The operator can determine if the part ID was changed at some point in the past, or if the initial operator provided incorrect data. For example, the device ID column 965 includes device IDs from operators in (1) Los Angeles, California (LAX), (2) Queens, New York (JFK) and (3) Denver, Colorado (DEN) as indicated in the first three characters of the device ID. Conversely, the recorded device locations are in (1) Los Angeles, (2) Queens, and (3) Miami. Clearly the device location of (3) does not match with the device ID. In this way, the provenance data report 950 may inform the operator of incorrect data. Moreover, the ownership ID column shows that the ownership of the part being investigated (part ID DP-1032) changed from AMERICAN AIRLINES® to JETBLUE®. The operator might consider this a discrepancy and investigate the chain of title of the part. These graphical displays may provide a simpler way to confirm that not only the data is correct, but also the chain of title and device which updated that data has also been authenticated.

After selecting an asset record through the operator interface 800 (e.g., via icon 840), the user may be directed to an asset record interface, such as the example asset record interface 870 shown in FIG. 8b. It is also understood that the example asset record interface may be included is displayed in a report like fashion, such as on a webpage. As illustrated, the asset record interface 870 includes a plurality of portions for the operator of computing device 810 to review and/or select. For instance, the asset record interface 870 may display a timestamp data portion 871, a geolocation data portion 872, an authentication ID data portion 873, an operating device signature data portion 874, a maintenance data portion 875, and a component identifying data portion 876.

As an example, FIG. 8c shows operator interface or record interface 880, which is derived from asset record interface 870 and has been populated with data associated with a particular device. FIG. 8c is contemplated as being an interface relating to the tires of the landing gear of an aircraft. Other types of data associated with different types of components may be used and are within the spirit and scope of the present invention. The maintenance data portion 885 shows that the last maintenance to occur was replacing the tires. Furthermore, the asset record for the tires was updated at 8:45 PM as shown in the time stamp data portion 881. The aircraft is identified as having the tires replaced at LAX (Los Angeles Airport) in the geolocation data portion 882. The graphical representation of the signature 884 of the operator associated with changing the tires is, "XZQ11A" as evidenced by the operating device signature data portion 874. Moreover, the transaction on the ledger has been certified (e.g., authenticated) and is associated with ID number 880154 in the certification data portion 883. The certification data portion allows the user to be certain that the information associated with a particular transaction has been authenticated because the computing device from which the data associated with transaction war received was authenticated device. In other words, the device that input the information has a signature that matches the signature stored on the server. The component identifying data portion 886 shows that the replacement tires were replaced with DUN-LOP® tires, specifically DR26020T tires for a BOEING® 747. In this way, a record interface (870, 880) for an asset record can readily apprise an operator of the most recent data. Furthermore, the operator may readily access historical data by selecting one of the data portions (871-876, 881-886). Thus, in one embodiment, an operator interface comprises a plurality of portions, each portion displaying a single metric derived from the asset record. In one embodiment, the plurality of portions includes one or more of a timestamp data portion 871, a geolocation data portion 872, an authentication ID data portion 873, an operating device signature data portion 874, a maintenance data portion 875, and a component identifying data portion 876. In one embodiment, at least one of the data portions (871-876) includes an embedded hyperlink to access a plurality of metrics associated with attributes (e.g., historical data). What is important to note is that the particular reports allow a user to easily determine whether or not the person (e.g., operator) updating a record, or viewing a record, did so from an authenticated device. Additionally, the reports allow a user to easily identify information that may be stored on a ledger and also allows the user to easily identify particular information associated with a particular asset.

As noted above, an identifying mark may be used to readily access an asset record. The asset record may be for an aircraft itself, or for any of the components of the aircraft. Regardless, the user may need to utilize the identifying mark, such as by scanning the identifying mark, to access the asset records. The user may use an exemplary operator interface, such as by selecting the QR code icon 855 on ring- or wheel-type graphical representation 820 shown in FIG. 8a, to access a scanning device (e.g., camera) from the operator's device. After doing so, the operator may be directed to an identifying mark interface, such as the identifying mark interface 900 shown in FIG. 9a. As shown, the interface opens the camera of remote computing device 910. The camera portion of the interface 920 reflects the physical identifying mark 912, which is a QR code. Scanning the identifying mark 912 may occur automatically (e.g., the software may auto-detect the QR code), and/or the user may need to press a capture button 930 to capture a photo of identifying mark 912 for subsequent processing to identify the identifying mark 912. Regardless, the identifying mark interface 900 allows the operator to quickly and easily access the asset records associated with a particular asset via the identifying mark 912.

As noted above, an asset record may be an asset record for an aircraft as a whole. The asset record for the aircraft may include a plurality of asset records associated with the various components of the aircraft. The aforementioned server may be configured to automatically review each asset record associated with the aircraft asset record and generate suggested maintenance tasks for the operator. The suggested maintenance tasks may be generated based on rules-based algorithms, machine learned algorithms, and combinations thereof. Advantageously, the operator can immediately electronically access this critical information by scanning an identifying mark. With reference now to FIG. 10a, a graphical user interface 1010 for an aircraft is shown. As illustrated, FIG. 10a is shown on a mobile device, such as smartphone. The graphical user interface 1010 shows the aircraft 1020 and an identifying data element 1030 for the particular asset. Furthermore, graphical user interface 1010 includes a notifying message 1040 (i.e., the number 3 that indicates 3 maintenance recommendations require the operator's review). A graphical user interface like the graphical user interface 1010 illustrated in FIG. 10a may also include other information, such as a flight schedule 1050 and/or maintenance history 1060. The operator may readily access the maintenance recommendations by using a gesture to select the notifying message 1040. For instance, a swipe, push, or other screen gesture means for selecting the notifying message 1040. After selecting the notifying message 1040, the operator may be redirected to a new interface, such as interface 1012 shown in FIG. 10b. As illustrated, the maintenance recommendations interface 1012 shows three potential maintenance tasks that the operator should undertake before the aircraft is permitted to fly again. For instance, first recommendation 1041 is to replace the tires on the landing gear. The second recommendation 1042 is for the operator to initiate a "D check" on the aircraft, which may be a part of the airline's ABC check system for aircraft maintenance. Lastly, the third recommendation 1043 suggests replacing the anti-collision lights (e.g., red lights located on the top and bottom of the aircraft).

In one embodiment, after the generating the response message step 574, the method comprises transmitting, over the communications network, to the operator computing device 104 a user interface comprising a wheel type interface for toggling between at least a first subset of the plurality of attributes and a second subset of the plurality of attributes for the particular asset, wherein the first subset of the plurality of attributes are associated with original equipment manufacturer of the particular asset and wherein the second subset of the plurality of attributes are associated with maintenance, repair and operation of the particular asset.

At the operator's direction, the operator may submit an operator request message 240 using the operator interface. The operator request message 240 may be transmitted over the network and received by server 120. The operator request message 240 may include a first portion of code 241 for requesting at least a portion of (e.g., a metric associated with an attribute) an asset record from the ledger 114 on the blockchain 116. A second portion of code 242 may include (i) the unique asset identifier, (ii) an operator computing device signature associated with the particular operator computing device, and (iii) the geographic location of the operator computing device (e.g., a global positioning system ("GPS") coordinate). In a receiving step 420, the server 120 may receive the operator request message.

After receiving the operator request message in the receiving step 420, the server 120 may access the appropriate asset record requested by the operator request message 240 in the ledger 114. Accessing the asset record 223 may include generating, by the server 120, an access or query message 250. Next, the server may send a query or access message 250 may be sent to the blockchain 116. The access or query message 250 may include a signature 251 associated with the operator and/or the operator's device 104. Furthermore, the access or query message 250 may include a unique identifying data element 252 associated with identifying mark 112. After verifying the access message 250 is authentic message by querying the data on the blockchain, the blockchain 116 may send a blockchain response message 260 to server 120, the blockchain response message 260 including a copy of the asset record 261. A blockchain signature 262 may also be included in the blockchain response message 260 and may be used to ensure non-repudiation and data integrity of the request. The blockchain signature 262 may be a cryptographic signature, a non-cryptographic signature, and combinations thereof.

After the accessing step 430, the method includes a generating a response message step 440. The response message generating step 440 may include manipulating, by the server 120, the copy of asset record 261 from the blockchain response message 260 to fit the needs of the operator. For instance, the operator's request message may have requested a single metric from a plurality of possible metrics found in the asset record 223. The response generating step 440 may include re-formatting the copy of the asset record 261 to eliminate the unnecessary, non-requested metrics. In sum, the generating step 440 prepares an appropriate response message 270 that corresponds with the operator's request. In one embodiment, the response message includes (i) at least one metric 271 associated with at least one of the plurality of attributes of the particular asset and ii) a geographic attribute 272 corresponding to information related to the geographic location of the operator computing device.

Figure 5B:
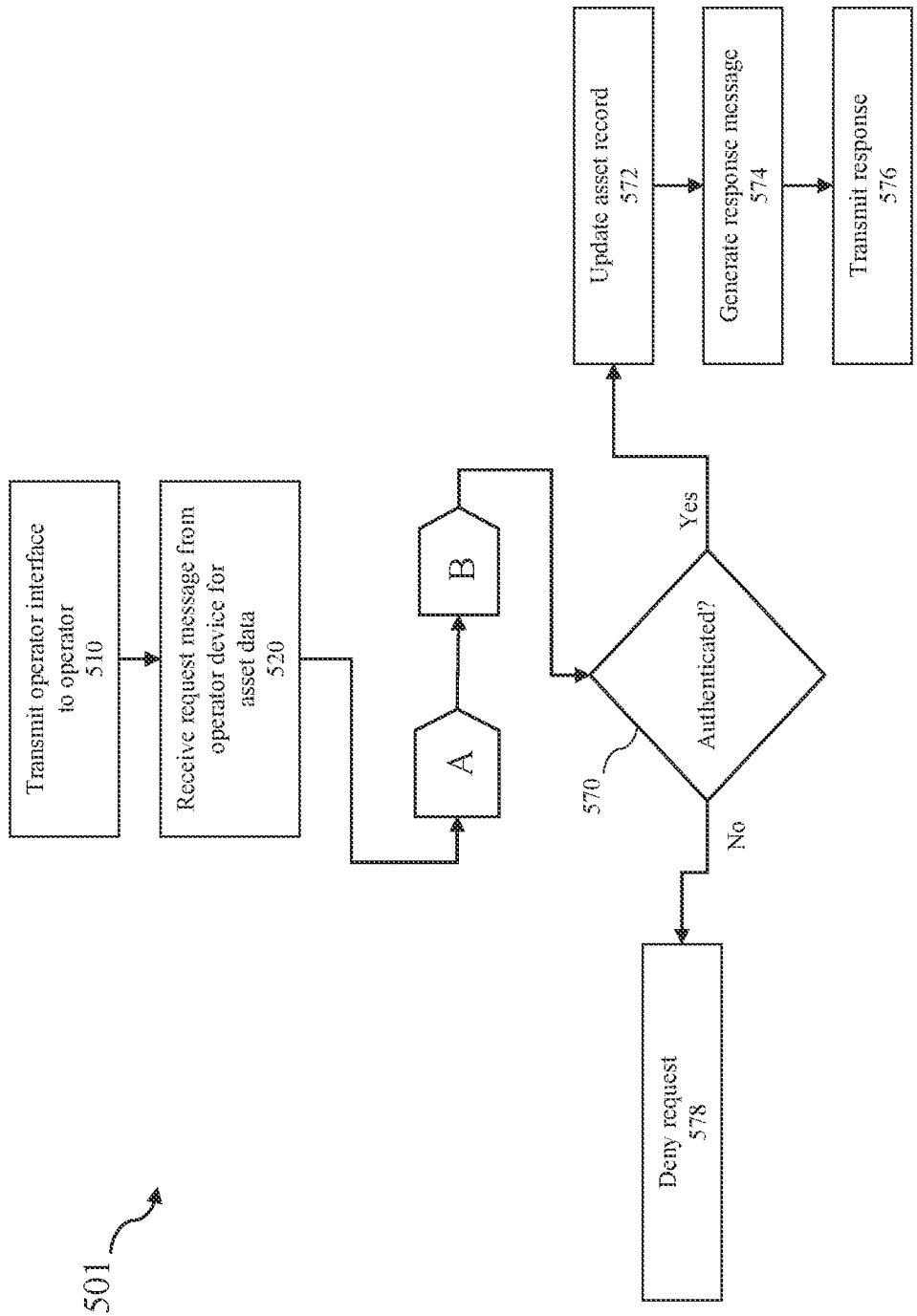
FIG. 5b is a block flow diagram of an example embodiment for updating or accessing, by an operator, an asset record.

With reference now to FIGS. 5a-5c, a system 500 and method (501, 502) for updating an asset record is shown. As will be described in greater detail below, an operator's request may be authenticated via a plurality of second devices (140a-140c). Authenticating the operator's device may be performed to ensure data integrity of asset records on the ledger 114.

Method 501 comprises a first transmitting step. In the transmitting step 510, a second operator interface for receiving operator input data is transmitted via second operator interface message 580 by server 120. The second operator interface message 580 is transmitted over the communications network and to the operator's device 104. The operator input data is generally associated with at least one metric of a particular attribute for a particular asset.

After the transmitting step 510, method 501 comprises a receiving step 520. The receiving step 520 comprises receiving, at the direction of an operator and over the communications network, an update request message 583 from the operator via the operator's device 104. The update request message generally includes a request to update at least one metric of a particular attribute for a particular asset. Furthermore, the update request message generally includes (i) the unique asset identifier 584, (ii) the operator computing device signature 585 associated with the operator computing device, (iii) the geographic location 586 for the operator computing device, and (iv) unauthenticated data 587. The unauthenticated data 587 generally includes data associated with the metric that has been identified in the update request message 583. A plurality of metrics, a plurality of attributes, and a plurality of assets may be updated with an update request message 583.

Following the receiving step 520, method 501 comprises a generating step 530 (follow off-screen connector A from FIG. 5b to FIG. 5c). The generating step 530 comprises generating, by server 120, an authentication request message 590. The authentication request message 590 may comprise (i) the data from the update request message 591, and (ii) a timestamp 592. After the generating step 530, server 120 may send the authentication request message 590 to a plurality of decentralized second computing devices (140a-140c) in transmission step 540. After the transmission step 540, each of the plurality of decentralized computing devices (140a-140c) may authenticate the authentication request message, such as authenticating the contents of the update request message 591 (data and timestamp 592). Authenticating the request message may include authenticating each portion of the data separately. For instance, second party device 140a may authenticate a first portion of the data, such as the manufacturing data. Second party device 140b may authenticate maintenance data. Lastly, second party device 140c may authenticate IPC data. Alternatively, all of the data may be authenticated by the second party devices. Authentication may also include authenticating by inspecting any signature(s) involved with the request message.

After the plurality of decentralized computing devices (140a-140c) authenticate the authentication request message 590, each of the plurality of decentralized computing devices (140a-140c) may send an authentication request message response (553a-553c). As illustrated, the plurality of authentication request message responses 552 comprise a first response 553a, a second response 553b, and a third response 553c from their respective second devices. The plurality of authentication request message responses 552 may include an approval or denial of the authentication request.

Regardless, server 120 may receive the plurality of authentication request message responses 552 in receiving step 550 and process them. The server 120 may determine if there is a threshold consensus 562 among the plurality of decentralized second devices. In other words, the server 120 pools the authentication request message responses (553a-553c) and determines if the data from the update request message meets data integrity standards and if the data should be implemented on ledger 114.

If a threshold consensus is met at 562, server 120 may grant access to ledger 114 in a granting step 564. Alternatively, a denial step 566 occurs. If a threshold consensus has been met, the request has been authenticated (i.e., the granting step 564 has occurred) at step 570, and the method comprises an updating step 572 for updating the asset record. The updating step 572 may comprise sending an update message 542. Update message 542 generally includes the data from the update request message 543. Blockchain 116 receives the update message 542 and updates the appropriate asset record(s) on ledger 114.

The threshold consensus may be adjusted depending on a variety of different factors. For example, the threshold census may be a certain percentage of the authenticating devices finding that the data associated with the asset record or device (e.g., first device, operator device) is or has been authenticated. It is understood that the signature of each of computing device may be stored in the attached databases of the second party computing devices (not illustrated). In other embodiments, the threshold consensus may require 100% consensus. In certain embodiments, the second party computing devices may only authenticate a certain particular component of data. For example, one second party computing device may only authenticate whether the maintenance records are accurate. Additionally, another second party computing device may only authenticate a second particular component of data related to hey particular assets such as maintenance deadlines. However, it is understood that other types of data may be authenticated and each of the second party computing devices may only be configured to authenticate a particular portion of the entire data packet.

After the appropriate updating, the blockchain 116 may generate a response message in generating step 574. Generating the response message may include, for instance, preparing a message that includes the updated asset record(s). Regardless, update response message 545 is transmitted over the communications network to server 120. Server 120 may then send a copy of the response message 546 to the operator's device 104.

As noted above, in the event that a threshold consensus is not met at threshold consensus 562, the server 120 may execute a denial step 566. The denial step 566 may deny access to requested asset records and/or deny a request to update a particular asset record. Thus, at step 570, the update request message is denied in step 578. Moreover, update response message 545 may include a denial message to be sent to the operator's device 104.

In some embodiments (not illustrated), a method comprises a second authentication step after an updating step. A second authentication step may allow for the plurality of decentralized second devices to authenticate that the asset record has been updated on the ledger. The second authentication step may be performed prior to the transmitting step 576 above, where the response message is transmitted to the operator's device. Thus, in one embodiment a method comprises generating a second authentication request message. The second authentication request message may comprise the data from the operator request message, and/or a second timestamp. After the generating step, the method comprises a transmitting step. The second transmitting step may comprise transmitting, over the communications network, to the plurality of decentralized second computing devices, the second authentication request message. After the transmitting step, the method may comprise a receiving step. The receiving step may comprise receiving, over the communications network, a second authentication request message response from each of the plurality of decentralized second computing devices. The second authentication request message responses may include at least one of a second approval or a second denial of the second authentication request message. After the receiving step, the server may determine if there is a threshold consensus that has been met (e.g., to determine if the operator's update request was properly executed on ledger 114). If the desired threshold consensus is met, the method may comprise generating and sending a response message. Alternatively, the consensus step may be skipped, and the response message may be generated and sent only if the second authentication request message response comprises the approval (e.g., unanimous approval, at least one approval) of the second authentication request message.

iii. Computing Devices

Figure 11:
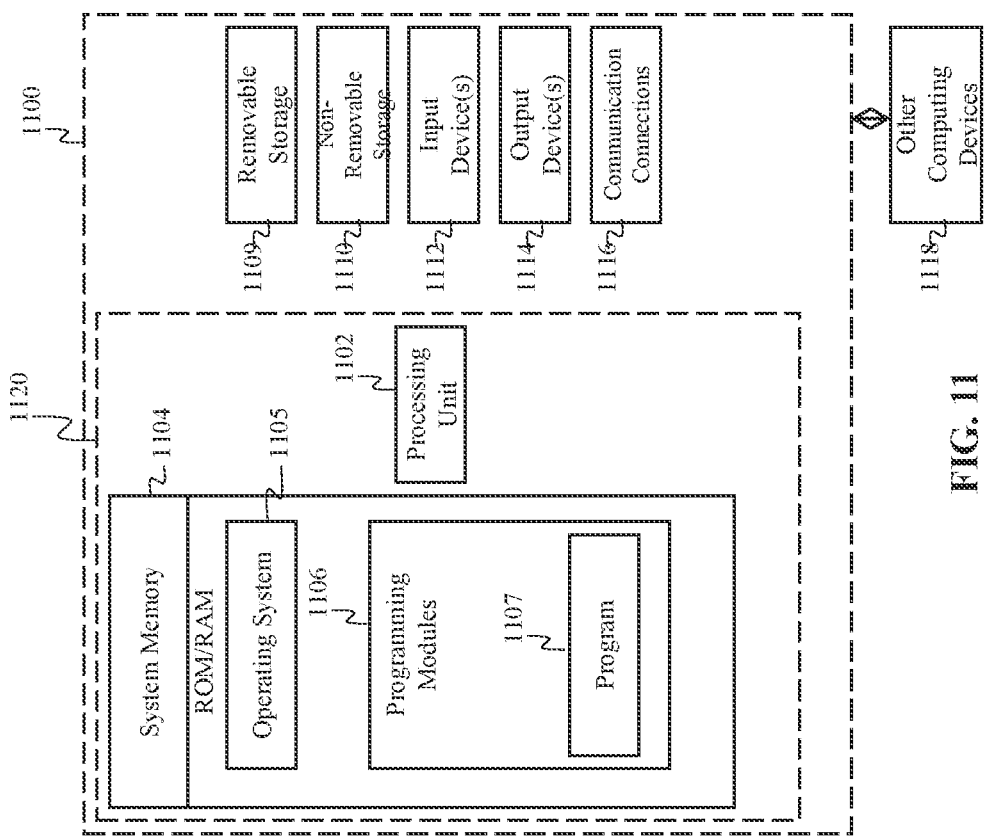
FIG. 11 is a block diagram of a system including an example computing device and other computing devices, according to an example embodiment.

FIG. 11 is a block diagram of a system including an example computing device 1100 and other computing devices. Consistent with the embodiments described herein, the aforementioned actions performed by devices 104, 110, 140a-140c, and server 120 may be implemented in a computing device, such as the computing device 1100 of FIG. 11. Any suitable combination of hardware, software, or firmware may be used to implement the computing device 1100. The aforementioned system, device, and processors are examples and other systems, devices, and processors may comprise the aforementioned computing device. Furthermore, computing device 1100 may comprise or be included in the systems for implementing graphical displays and interfaces as described above.

In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination or memory. System memory 1104 may include operating system 1105, and one or more programming modules 1106. Operating system 1105, for example, may be suitable for controlling the computing device's 1100 operation. In one embodiment, programming modules 1106 may include, for example, a program module 1107 for executing the actions of server 120 and devices 104, 110, 140a-140c for example. Furthermore, embodiments of the invention may be practiced in conjunction with a graphics library, other operating systems, or any other application program and is not limited to any particular application or system. This basic configuration is illustrated in FIG. 11 by those components within a dashed line 1120.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and nonvolatile, removable, and non-removable media implemented in any method or technology for storage of information, such as computer readable instructions, data structures, program modules, or other data. System memory 1104, removable storage 1109, and non-removable storage 1110 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a camera, a touch input device, etc. Output device(s) 1114 such as a display, speakers, a printer, etc. may also be included. The aforementioned devices are only examples, and other devices may be added or substituted.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1104, including operating system 1105. While executing on processing unit 1102, programming modules 1106 (e.g. program module 1107) may perform processes including, for example, one or more of the stages of the methods described above. The aforementioned processes are examples, and processing unit 1102 may perform other processes and may also be configured to provide user interfaces displayed in FIGS. 8a-10b. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method executed by at least one server for monitoring and certifying a plurality of assets, the method comprising:
   receiving, from a first computing device, i) a first data packet comprising a plurality of asset data associated with an asset and ii) a first computing device signature associated with the first computing device;
   wherein the plurality of asset data comprises a unique asset identifier associated with the asset and a plurality of asset attributes associated with the asset, wherein each asset attribute has a metric, and wherein the first computing device signature provides non-repudiation and data integrity of the first data packet;
   wherein the first computing device signature is generated from at least a key provided by a second computing device;
   creating and recording, in an asset record, the plurality of asset data associated with the asset after authenticating the first computing device signature from one of a plurality of first computing device signatures stored in a connected database;
   subsequent to creating and recording the asset record, receiving, over a communications network, a request message for at least a portion of the plurality of asset data associated with at least one of the plurality of asset attributes for one of the plurality of assets;
   accessing, in the connected database, the asset record associated with the request message and reading the plurality of asset data in the asset record; and
   generating a response message to the request message based on the plurality of asset data in the asset record, wherein the response message includes i) at least one metric associated with at least one of the plurality of asset attributes of the asset and ii) a tag identifying that the at least one metric provided in the response message has been authenticated.

2. The method of claim 1, wherein the first computing device signature is generated from the key and a geographic location associated with the first computing device.

3. The method of claim 2, wherein further recording, in the asset record when the asset record is created, a ledger entry identifying at least one of (i) the first computing device signature that created the asset record and (ii) a first computing device identifier of the first computing device that created the asset record.

4. The method of claim 3, wherein after recording in the asset record the plurality of asset data for the asset and prior to generating the response message, the method further comprises:
receiving, over the communications network, from the first computing device an update request message to update the at least one metric of one of the plurality of asset attributes of the plurality of assets, where the update request message comprises:
i) the unique asset identifier;
ii) the first computing device signature associated with the first computing device;
iii) unauthenticated data; and
where the unauthenticated data is associated with the at least one metric of one of the plurality of asset attributes of the plurality of assets;
authenticating, the first computing device signature;
updating the at least one metric of the plurality of asset attributes in the asset record only if the first computing device signature is authenticated; and
recording a second ledger entry identifying (i) the first computing device signature that sent the update request message and (ii) the first computing device identifier of the first computing device that sent the update request message.

5. The method of claim 4, wherein the asset record comprises at least a documentation associated with the asset, a certification associated with the asset, maintenance records associated with the asset, a geolocation associated with the asset, an Illustrated Parts Catalog (IPC) associated with the asset and Component Maintenance Manual (CMM) associated with the asset.

6. The method of claim 5, wherein authenticating the first computing device signature further comprises comparing the geolocation associated with the asset with the geographic location associated with the first computing device to determine if geolocation is within a predetermined maximum radius of the geographic location associated with the first computing device.

7. The method of claim 6 further comprising transmitting, over the communications network, to at least one of the first computing device and a third computing device, the response message, wherein the response message further comprises the ledger entry and the second ledger entry.

8. The method of claim 7, wherein transmitting comprises transmitting via HTTPS.

9. A method executed by at least one server for monitoring and certifying a plurality of assets, over a communications network, the method comprising:
receiving, from a first computing device, i) a first data packet comprising a plurality of asset data associated with an asset and ii) a first computing device signature associated with the first computing device;
wherein the plurality of asset data comprises a unique asset identifier associated with the asset and a plurality of asset attributes associated with the asset, wherein each asset attribute has at least one metric, and wherein the first computing device signature provides non-repudiation and data integrity of the first data packet;
wherein the first computing device signature is generated from at least a key provided by a second computing device; and
creating and recording, in a connected database, an asset record, the plurality of asset data associated with the asset after authenticating the first computing device signature.

10. The method of claim 9, wherein after recording in the asset record the plurality of asset data for the asset, the method further comprises:
receiving, over the communications network, from the first computing device an update request message to update the at least one metric of one of the plurality of asset attributes of the plurality of assets, where the update request message comprises:
i) the unique asset identifier;
ii) the first computing device signature associated with the first computing device;
iii) unauthenticated data; and
where the unauthenticated data is associated with the at least one metric of one of the plurality of asset attributes of the plurality of assets;
authenticating, the first computing device signature;
updating the at least one metric of the plurality of asset attributes in the asset record only if the first computing device signature is authenticated; and
recording a ledger entry identifying at least one of (i) the first computing device signature that sent the update request message and (ii) a first computing device identifier of the first computing device that sent the update request message.

11. The method of claim 10, wherein the method further comprises:
receiving, over the communications network, a request message for at least a portion of the plurality of asset data associated with at least one of the plurality of asset attributes for one of the plurality of assets;
accessing, in the connected database, the asset record associated with the request message;
generating a response message to the request message based on the plurality of asset data in the asset record, wherein the response message includes i) at least one metric associated with at least one of the plurality of asset attributes of the asset and ii) and a tag identifying that the at least one metric provided in the response message has been authenticated; and
transmitting, over the communications network, to at least one of the first computing device and a third computing device, the response message, wherein the response message further comprises the ledger entry.

12. A method executed by at least one server for monitoring and certifying a plurality of assets, the method comprising:
receiving, from a first computing device, i) a first data packet comprising a plurality of asset data associated with an asset and ii) a first computing device signature associated with the first computing device;
wherein the plurality of asset data comprises a unique asset identifier associated with the asset and a plurality of asset attributes associated with the asset, wherein each asset attribute has at least one metric, and wherein the first computing device signature provides non-repudiation and data integrity of the first data packet;
wherein the first computing device signature is generated from a key and a geographic location associated with the first computing device;
creating and recording, in a connected database, an asset record, the plurality of asset data associated with the asset after authenticating the first computing device signature from a plurality of first computing device signatures stored in the connected database, wherein a ledger entry identifying at least one of (i) the first computing device signature that created the asset record and (ii) a first computing device identifier of the first computing device that created the asset record are recorded in the asset record when the asset record is created; and
receiving, over a communications network, from the first computing device an update request message to update the at least one metric of one of the plurality of asset attributes of the plurality of assets, where the update request message comprises:
  i) the unique asset identifier;
  ii) the first computing device signature associated with the first computing device;
  iii) unauthenticated data; and
  where the unauthenticated data is associated with the at least one metric of one of the plurality of asset attributes of the plurality of assets;
authenticating, the first computing device signature;
updating the at least one metric of the plurality of asset attributes in the asset record only if the first computing device signature is authenticated;
recording a second ledger entry identifying (i) the first computing device signature that sent the update request message and (ii) the first computing device identifier of the first computing device that sent the update request message;
subsequent to recording a second ledger entry, receiving, over a communications network, a request message for at least a portion of the plurality of asset data associated with at least one of the plurality of asset attributes for one of the plurality of assets;
accessing, in the connected database, the asset record associated with the request message and reading the plurality of asset data in the asset record; and
generating a response message to the request message based on the plurality of asset data in the asset record, wherein the response message includes i) at least one metric associated with at least one of the plurality of asset attributes of the asset and ii) and a tag identifying that the at least one metric provided in the response message has been authenticated.

13. The method of claim 12, wherein the asset record comprises at least a documentation associated with the asset, a certification associated with the asset, maintenance records associated with the asset, a geolocation associated with the asset, an Illustrated Parts Catalog (IPC) associated with the asset and Component Maintenance Manual (CMM) associated with the asset.

14. The method of claim 12, wherein authenticating the first computing device signature further comprises comparing a geolocation associated with the asset with the geographic location associated with the first computing device to determine if geolocation is within a predetermined maximum radius of the geographic location associated with the first computing device.

15. The method of claim 14 further comprising transmitting, over the communications network, to at least one of the first computing device and a third computing device, the response message, wherein the response message further comprises the ledger entry and the second ledger entry.

16. The method of claim 15, where transmitting comprises transmitting via HTTPS.

17. A method executed by at least one server for monitoring and certifying a plurality of assets, the method comprising:
  receiving, from a first computing device, i) a first data packet comprising a plurality of asset data associated with an asset and ii) a first computing device signature associated with the first computing device;
  wherein the plurality of asset data comprises a unique asset identifier associated with the asset and a plurality of asset attributes associated with the asset, wherein each asset attribute has a metric, and wherein the first computing device signature provides non-repudiation and data integrity of the first data packet;
  wherein the first computing device signature is generated from at least a key provided by a second computing device;
  creating, in a connected database, an asset record; and
  recording, in the asset record, the plurality of asset data associated with the asset after authenticating the first computing device signature from one of a plurality of first computing device signatures stored in the connected database.

* * * * *